US012003931B2

United States Patent
Chun et al.

(10) Patent No.: US 12,003,931 B2
(45) Date of Patent: Jun. 4, 2024

(54) METHOD FOR PROVIDING AUDIO DATA ACCORDING TO THE FOLDING STATE OF AN ELECTRONIC DEVICE AND ELECTRONIC DEVICE FOR SUPPORTING SAME

(71) Applicant: Samsung Electronics Co., Ltd., Gyeonggi-do (KR)

(72) Inventors: Woosung Chun, Gyeonggi-do (KR); Dongyup Lee, Gyeonggi-do (KR); Hokeun Kwak, Gyeonggi-do (KR); Chanyoung Moon, Gyeonggi-do (KR); Doosik Park, Gyeonggi-do (KR); Mooyoung Kim, Gyeonggi-do (KR); Kihuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 17/436,237

(22) PCT Filed: Mar. 3, 2020

(86) PCT No.: PCT/KR2020/003006
§ 371 (c)(1),
(2) Date: Sep. 3, 2021

(87) PCT Pub. No.: WO2020/180089
PCT Pub. Date: Sep. 10, 2020

(65) Prior Publication Data
US 2022/0159378 A1    May 19, 2022

(30) Foreign Application Priority Data
Mar. 4, 2019   (KR) .......................... 10-2019-0024601

(51) Int. Cl.
*H04R 3/12* (2006.01)
*H04R 1/22* (2006.01)
*H04S 7/00* (2006.01)

(52) U.S. Cl.
CPC ............... *H04R 3/12* (2013.01); *H04R 1/227* (2013.01); *H04S 7/301* (2013.01); *H04S 7/307* (2013.01); *H04R 2499/11* (2013.01)

(58) Field of Classification Search
None
See application file for complete search history.

(56) References Cited

U.S. PATENT DOCUMENTS

| 7,697,281 B2 | 4/2010 | Dabov et al. |
| 8,139,762 B2 | 3/2012 | Kuroda et al. |

(Continued)

FOREIGN PATENT DOCUMENTS

| JP | 2010-263559 A | 11/2010 |
| JP | 2013-150160 A | 8/2013 |

(Continued)

OTHER PUBLICATIONS

WO-2013058456-A2 English Machine Translation (Year: 2013).*
Korean Office Action dated Aug. 17, 2023.
Notice of Patent Grant dated Feb. 20, 2024.

*Primary Examiner* — James K Mooney
(74) *Attorney, Agent, or Firm* — Cha & Reiter, LLC

(57) ABSTRACT

An electronic device according to an embodiment of the present invention may include: a housing including a first housing and a second housing; a hinge unit rotatably connected to the first housing and the second housing; a display; a first speaker disposed in the first housing; a second speaker disposed in the second housing; at least one sensor; and a memory. The memory may store instructions which, when executed, cause the processor to: receive an event related to audio data; identify a state of the electronic device on the (Continued)

basis of information obtained through the at least one sensor; determine at least one speaker to output the audio data, among the first speaker and the second speaker, on the basis of the state of the electronic device; and output the audio data through the at least one speaker.

18 Claims, 14 Drawing Sheets

(56) References Cited

U.S. PATENT DOCUMENTS

| | | | |
|---|---|---|---|
| 9,026,183 B2 | 5/2015 | Ku | |
| 2009/0003630 A1* | 1/2009 | Kuroda | H04R 1/02 |
| | | | 381/150 |
| 2009/0072782 A1 | 3/2009 | Randall | |
| 2012/0052925 A1 | 3/2012 | Ku | |
| 2014/0210740 A1 | 7/2014 | Lee | |
| 2015/0319282 A1* | 11/2015 | Park | G06F 1/1626 |
| | | | 455/566 |
| 2015/0358445 A1 | 12/2015 | Forutanpour et al. | |
| 2017/0052566 A1 | 2/2017 | Ka et al. | |
| 2017/0278516 A1 | 9/2017 | Choi | |
| 2018/0027329 A1 | 1/2018 | Jeon et al. | |
| 2018/0109871 A1* | 4/2018 | Huh | G06F 1/1652 |
| 2018/0329461 A1* | 11/2018 | Hernandez Santisteban | |
| | | | G06F 1/1616 |
| 2019/0140342 A1 | 5/2019 | Lim et al. | |

FOREIGN PATENT DOCUMENTS

| | | |
|---|---|---|
| JP | 2013-201494 A | 10/2013 |
| JP | 2014-107785 A | 6/2014 |
| KR | 10-2009-0128450 A | 12/2009 |
| KR | 10-2012-0020741 A | 3/2012 |
| KR | 10-2014-0098384 A | 8/2014 |
| KR | 10-1632008 B1 | 7/2016 |
| KR | 10-2017-0010494 A | 2/2017 |
| KR | 10-2017-0120985 A | 11/2017 |
| KR | 10-2018-0010866 A | 1/2018 |
| KR | 10-2018-0040797 A | 4/2018 |
| KR | 10-1949006 B1 | 2/2019 |
| WO | 2013/058456 A2 | 4/2013 |
| WO | WO-2013058456 A2 * | 4/2013 ........... G06F 1/1641 |

* cited by examiner

METHOD FOR PROVIDING AUDIO DATA ACCORDING TO THE FOLDING STATE OF AN ELECTRONIC DEVICE AND ELECTRONIC DEVICE FOR SUPPORTING SAME

CROSS REFERENCE TO RELATED APPLICATIONS

This application is a National Phase Entry of PCT International Application No. PCT/KR2020/003006, which was filed on Mar. 3, 2020, and claims a priority to Korean Patent Application No. 10-2019-0024601, which was filed on Mar. 4, 2019, the contents of which are incorporated herein by reference.

TECHNICAL FIELD

One or more embodiments of the instant disclosure generally relate to a method for providing audio data and an electronic device supporting the same.

BACKGROUND ART

Electronic devices currently in the marketplace, such as smartphones, provide various multimedia services in addition to call function in order to satisfy consumers' various needs.

Recently, electronic devices including foldable displays are being developed. Since an electronic device including a foldable display can be carried in a folded state, it can provide enhanced portability.

DISCLOSURE OF INVENTION

Technical Problem

An electronic device including a foldable display may have a speaker (or a receiver, e.g. a telephone receiver) disposed only in one housing of a plurality of housings of the foldable display, due to restrictions to battery capacity and mounting space. Accordingly, when a call is received, the user may be inconvenienced in that he or she would have to identify which of the housing the speaker is disposed in order to hold a telephone call.

Certain embodiments of the instant disclosure generally relate to a method for providing audio data, in which audio data is outputted via a speaker selected from a plurality of speakers depending on the state of an electronic device, and an electronic device supporting the same.

The technical objects to be achieved by the disclosure are not limited to that mentioned above, and other technical objects that are not mentioned above may be clearly understood to those skilled in the art based on the description provided below.

Solution to Problem

An electronic device according to certain embodiments of the disclosure may include: a housing including a first housing having a first surface facing in a first direction, and a second housing having a second surface facing in a second direction; a hinge unit rotatably connected to the first housing and the second housing; a display exposed to an outside through the first surface of the first housing and the second surface of the second housing; a first speaker disposed within the first housing; a second speaker disposed within the second housing; at least one sensor; a processor operatively connected with the first speaker, the second speaker, and the at least one sensor; and a memory operatively connected with the processor, and the memory may store instructions that, when being executed, cause the processor to receive an event related to audio data, to identify a state of the electronic device, based on information acquired through the at least one sensor, to determine at least one speaker to output the audio data from among the first speaker and the second speaker, based on the state of the electronic device, and to output the audio data through the at least one speaker.

A method for providing audio data in an electronic device according to certain embodiments of the disclosure may include: receiving an event related to audio data; identifying a state of the electronic device, based on information acquired through at least one sensor of the electronic device; determining at least one speaker to output the audio data from among a first speaker which is disposed within a first housing having a first surface facing in a first direction, and a second speaker which is disposed within a second housing having a second surface facing in a second direction, based on the state of the electronic device; and outputting the audio data through the at least one speaker.

An electronic device according to certain embodiments of the disclosure may include: a housing including a first surface facing in a first direction and a second surface facing in a second direction, which is the opposite direction of the first direction; a first display exposed to the outside through the first surface; a second display exposed to the outside through the second surface; a first speaker and a second speaker which are disposed within the housing; at least one sensor; a processor which is operatively connected with the first speaker, the second speaker, and the at least one sensor; and a memory operatively connected with the processor, and the memory may store instructions that, when being executed, cause the processor to receive an event related to audio data, to identify a state of the electronic device based on information acquired through the at least one sensor, to determine at least one speaker to output the audio data from among the first speaker and the second speaker, based on the state of the electronic device, and to output the audio data through the at least one speaker.

Advantageous Effects of Invention

The method for providing audio data and the electronic device supporting the same according to certain embodiments of the instant disclosure can output audio data by using a speaker selected from a plurality of speakers based on a state of the electronic device.

BEST MODE FOR CARRYING OUT THE INVENTION

Figure 1:
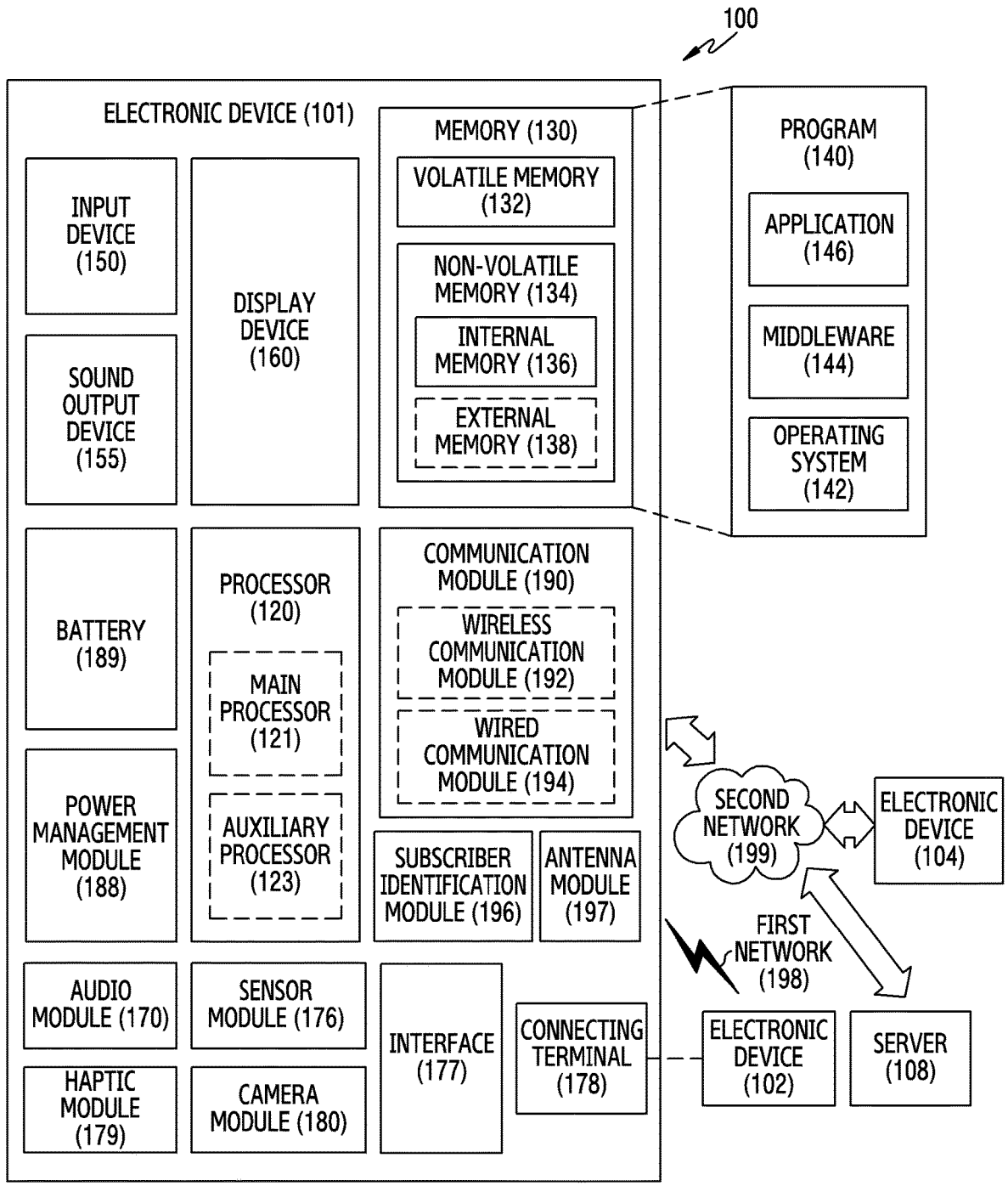
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
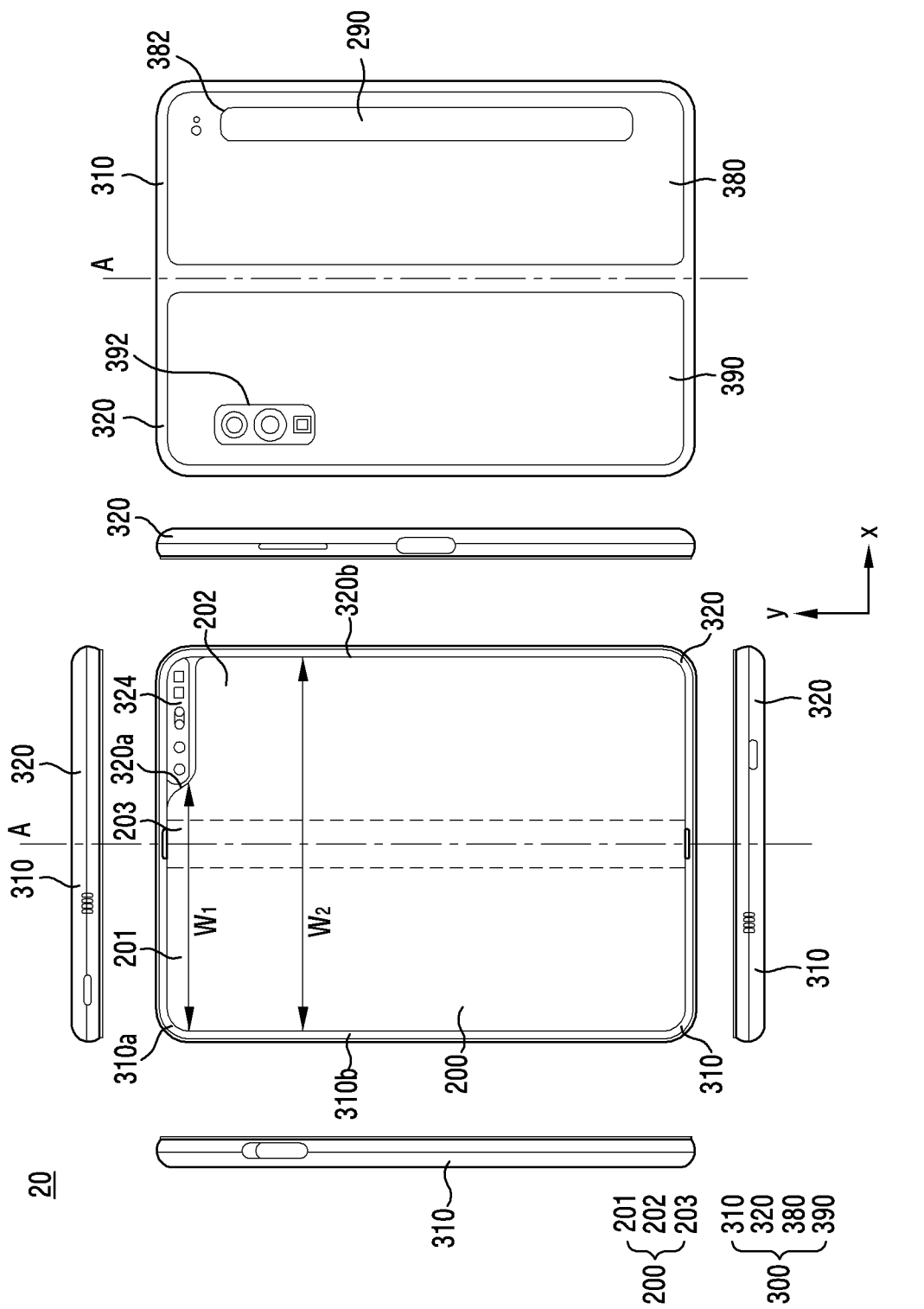
FIG. 2 is a view illustrating a flat state of an electronic device according to an embodiment.
Figure 3:
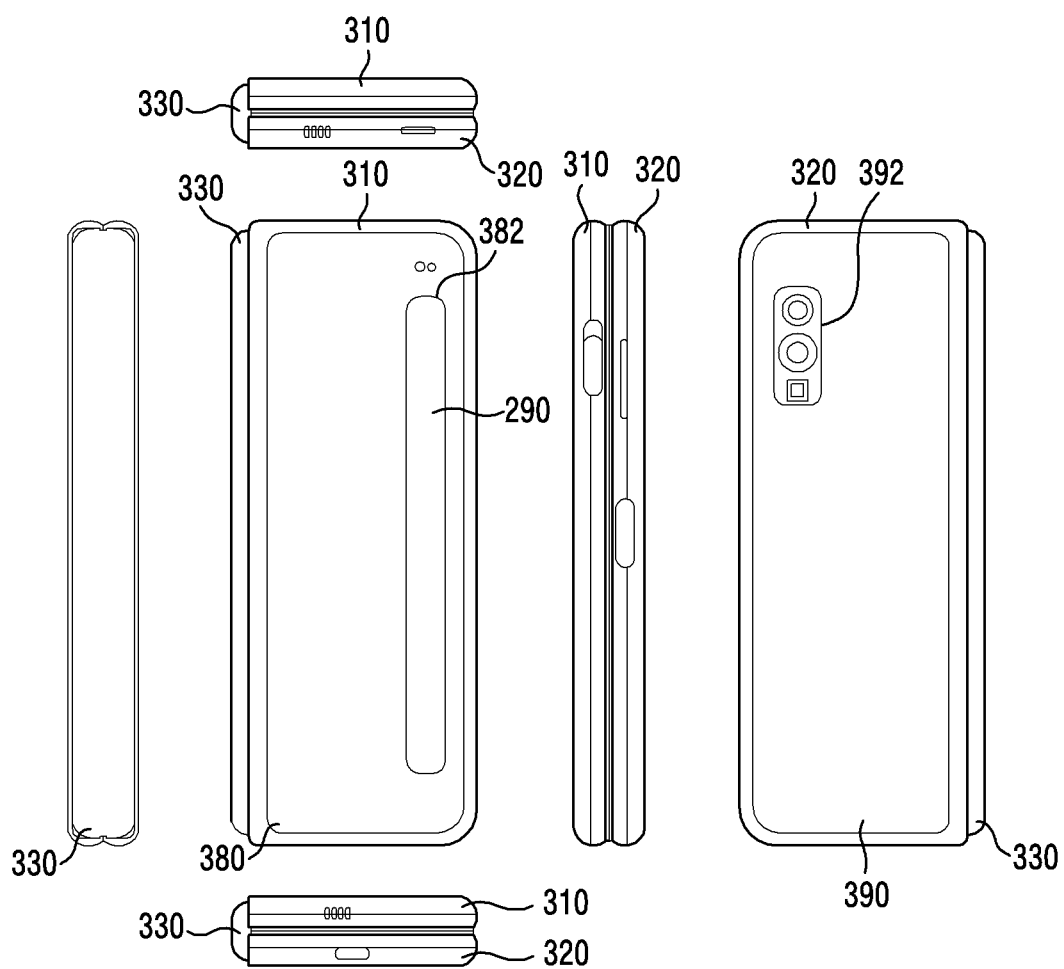
FIG. 3 is a view illustrating a folded state of the electronic device according to an embodiment.

FIG. 2 is a view illustrating a flat state of an electronic device according to an embodiment. FIG. 3 is a view illustrating a folded state of the electronic device according to an embodiment.

Figure 4:
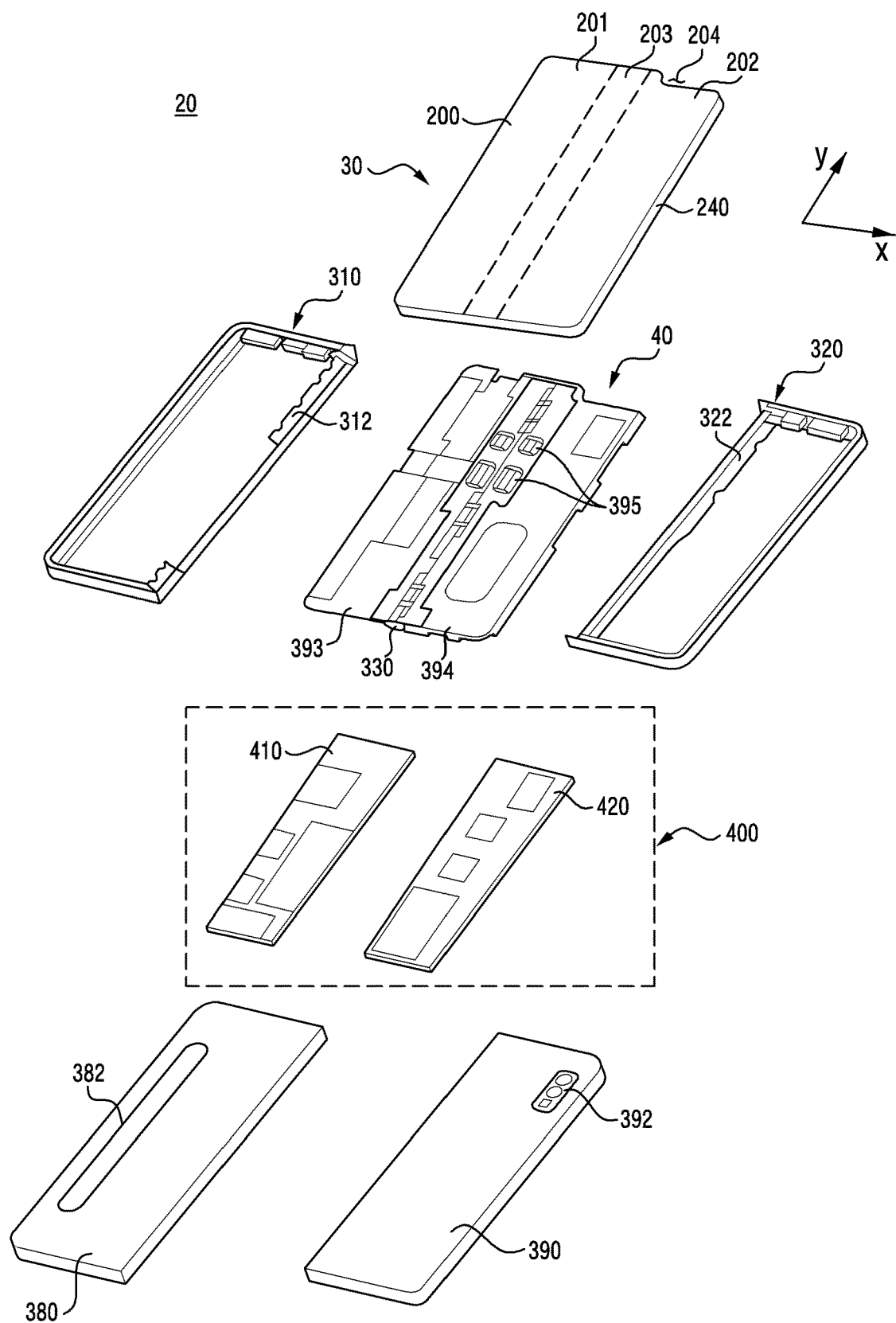
FIG. 4 is an exploded perspective view of the electronic device according to an embodiment.

Referring to FIGS. 2 and 3, in an embodiment, the electronic device 20 may be the same as or similar to the electronic device 101 of FIG. 1 at least in part. In an embodiment, the electronic device 20 may include a foldable housing 300, a hinge cover 330 to cover a foldable portion of the foldable housing, and a flexible or foldable display 200 (hereinafter, referred to as the display 200) disposed in a space formed by the foldable housing 300. In FIGS. 2 and 4, the surface on which the display 200 is disposed is referred to as the first surface or the front surface of the electronic device 20. In addition, the opposite surface of the front surface is referred to as the second surface or the rear surface of the electronic device 20. In addition, the surface surrounding a space between the front surface and the rear surface is referred to as the third surface or the side surface of the electronic device 20. In an embodiment, the display 200 may be the same as or similar to the display device 160 of FIG. 1 at least in part.

In an embodiment, the foldable housing 300 may include a first housing structure 310, a second housing structure 320 including a sensor area 324, a first rear surface cover 380, and a second rear surface cover 390. The foldable housing 300 of the electronic device 20 is not limited to the shape and arrangement illustrated in FIGS. 1 and 2, and may be implemented by a combination and/or coupling of other components in other shapes. For example, in another embodiment, the first housing structure 310 and the first rear surface cover 380 may be integrally formed with each other, and the second housing structure 320 and the second rear surface cover 390 may be integrally formed with each other.

In the illustrated embodiment, the first housing structure 310 and the second housing structure 320 may be disposed on both sides of a folding axis (A axis), and may be substantially symmetrical with respect to the folding axis A. As will be described below, the first housing structure 310 and the second housing structure 320 may have an angle or a distance therebetween that is changed according to whether the electronic device 20 is in a flat state, a folded state, or an intermediate state. In the illustrated embodiment, the second housing structure 320 additionally includes the sensor area 324 where various sensors are disposed, which is different from the first housing structure 310, but may be symmetrical with respect to the first housing structure 310 in other areas.

In an embodiment, as shown in FIG. 2, the first housing structure 310 and the second housing structure 320 may form a recess to accommodate the entirety of the display 200. In the illustrated embodiment, the recess may have two or more different widths in a direction perpendicular to the folding axis A due to the sensor area 324.

For example, the recess may have (1) a first width w1 between a first portion 310a of the first housing structure 310 that is parallel to the folding axis A, and a first portion 320a of the second housing structure 320 that is formed on an edge of the sensor area 324, and (2) a second width w2 formed by a second portion 310b of the first housing structure 310 and a second portion 320b of the second housing structure 320 that does not correspond to the sensor area 324 and is parallel to the folding axis A. In this case, the second width w2 may be longer than the first width w1. In other words, the first portion 310a of the first housing structure 310 and the first portion 320a of the second housing structure 320, which are asymmetrical with respect to each other, may form the first width w1 of the recess, and the second portion 310b of the first housing structure 310 and the second portion 320b of the second housing structure 320, which are symmetrical with respect to each other, may form the second width w2 of the recess. In an embodiment, the first portion 320a and the second portion 320b of the second housing structure 320 may have different distances from the folding axis A. The width of the recess is not limited to the illustrated example. In various other embodiments, the recess may have a plurality of widths according to a shape of the sensor area 324 or portions of the first housing structure 310 and the second housing structure 320 that are asymmetrical with respect to each other.

In an embodiment, at least a portion of the first housing structure 310 and the second housing structure 320 may be made of metallic material or nonmetallic material having a certain stiffness to support the display 200.

In an embodiment, the sensor area 324 may be formed to have a predetermined area adjacent to one corner of the second housing structure 320. However, the disposal, shape, and size of the sensor area 324 are not limited to the illustrated example. For example, in another embodiment, the sensor area 324 may be provided on another corner of the second housing structure 320 or a certain area between an upper end corner and a lower end corner. In an embodiment, components which are embedded in the electronic device 10 to perform various functions may be exposed to the front surface of the electronic device 10 through the sensor area 324 or one or more openings provided on the sensor area 324. In certain embodiments, the components may include various types of sensors. The sensors may include, for example, at least one of a front-facing camera, a receiver, or a proximity sensor.

The first rear surface cover 380 may be disposed on one side of the folding axis on the rear surface of the electronic device, and for example, may have a substantially rectangular shape and may have the periphery surrounded by the first housing structure 310. Similarly, the second rear surface cover 390 may be disposed on the other side of the folding axis on the rear surface of the electronic device, and may have its periphery surrounded by the second housing structure 320.

In the illustrated embodiment, the first rear surface cover 380 and the second rear surface cover 390 may be substantially symmetrical with reference to the folding axis (A axis). However, the first rear surface cover 380 and the second rear surface cover 390 may not necessarily be symmetrical, and in another embodiment, the electronic device 10 may include first rear surface cover 380 and second rear surface cover 390 that are in various shapes. In still another embodiment, the first rear surface cover 380 may be integrally formed with the first housing structure 310, and the second rear surface cover 390 may be integrally formed with the second housing structure 320.

In an embodiment, the first rear surface cover 380, the second rear surface cover 390, the first housing structure 310, and the second housing structure 320 may form a space to house various components (for example, a printed circuit board or a battery) of the electronic device 10. In an embodiment, one or more components may be disposed on the rear surface of the electronic device 10 such that they are visually exposed. For example, at least a portion of a sub display 290 (for example, the display device 160) may be visually exposed through a first rear surface area 382 of the first rear surface cover 380. In another embodiment, one or more components or a sensor may be visually exposed through a second rear surface area 392 of the second rear surface cover 390. In certain embodiments, the sensor may include a proximity sensor and/or a rear-facing camera.

Referring to FIG. 3, the hinge cover 330 may be disposed between the first housing structure 310 and the second housing structure 320, and may be configured to hide inner components (for example, a hinge structure). In an embodiment, the hinge cover 330 may be hidden by a portion of the first housing structure 310 and the second housing structure 320, or may be exposed to the outside, according to a state (a flat state or a folded state) of the electronic device 20.

For example, when the electronic device 20 is in the flat state as shown in FIG. 2, the hinge cover 330 may be hidden by the first housing structure 310 and the second housing structure 320 and may not be exposed. In another example, when the electronic device 20 is in the folded state (for example, a fully folded state) as shown in FIG. 3, the hinge cover 330 may be exposed to the outside between the first housing structure 310 and the second housing structure 320. In yet example, in an intermediate state in which the first housing structure 310 and the second housing structure 320 are folded with a certain angle, the hinge cover 330 may be exposed to the outside in part between the first housing structure 310 and the second housing structure 320. However, in this case, the exposed area may be smaller than in the fully folded state. In an embodiment, the hinge cover 330 may include a curved surface.

The display 200 may be disposed on the space formed by the foldable housing 300. For example, the display 200 may be seated on the recess formed by the foldable housing 300, and may form most of the front surface of the electronic device 10.

Accordingly, the front surface of the electronic device 20 may include the display 200, and some areas of the first housing structure 310 adjacent to the display 200 and some areas of the second housing structure 320. In addition, the rear surface of the electronic device 10 may include the first rear surface cover 380, some areas of the first housing structure 310 that are adjacent to the first rear surface cover 380, the second rear surface cover 390, and some areas of the second housing structure 320 that are adjacent to the second rear surface cover 390.

The display 200 may refer to a display that has at least some areas deformable to a flat surface or a curved surface. In an embodiment, the display 200 may include a folding area 203, a first area 201 disposed on one side (the left of the folding area 203 show in FIG. 2) with reference to the folding area 203, and a second area 202 disposed on the other side (the right of the folding area 203 shown in FIG. 2).

The divided areas of the display 200 shown in FIG. 2 are examples and the display 200 may be divided into a plurality of areas (for example, four or more areas or two areas) according to the structure or function of the display 200. For example, in the embodiment illustrated in FIG. 2, the display 200 may be divided into areas by the folding area 203 extended in parallel with the y-axis or the folding axis (A axis), but in another embodiment (not shown), the display 200 may be divided into areas with reference to another folding area (for example, a folding area parallel to the x-axis) or another folding axis (for example, a folding axis parallel to the x-axis).

The first area 201 and the second area 202 may be substantially symmetrical about the folding area 103. However, the second area 202 may include a notch that is cut according to the presence of the sensor area 324, and thus be different from the first area 201, but may be symmetrical to the first area 201 on other areas. In other words, the first area 201 and the second area 202 may include portions that are symmetrical and portions that are asymmetrical.

Hereinafter, operations of the first housing structure 310 and the second housing structure 320 and respective areas of the display 200 according to a state (for example, a flat state or a folded state) of the electronic device 20 will be described.

In an embodiment, when the electronic device 20 is in the flat state (for example, FIG. 1), the first housing structure 310 and the second housing structure 320 may form the angle of 180° and may be disposed to face in the same direction. A surface of the first area 201 of the display 200 and a surface of the second area 202 may form the angle of 180° with each other, and may face in the same direction (for example, the front surface direction of the electronic device). The folding area 203 may form the same plane as the first area 201 and the second area 202.

In an embodiment, when the electronic device 20 is in the folded state (for example, FIG. 3), the first housing structure 310 and the second housing structure 320 may be disposed to face each other. The surface of the first area 201 of the display 200 and the surface of the second area 202 may form a small angle (for example, between 0° and 10°) with each other, and may face each other. At least a portion of the folding area 103 may have a curved surface having a predetermined curvature.

In an embodiment, when the electronic device 20 is in the intermediate state (for example, FIG. 3), the first housing structure 310 and the second housing structure 320 may be disposed with a certain angle. The surface of the first area 201 of the display 200 and the surface of the second area 202 may form an angle that is larger than in the folded state and is smaller than in the flat state. At least a portion of the folding area 203 may have a curved surface having a predetermined curvature, and the curvature in this state may be smaller than in the folded state.

FIG. 4 is an exploded perspective view of an electronic device according to an embodiment.

Referring to FIG. 4, in an embodiment, the electronic device 20 may include a display unit 30, a bracket assembly 40, a board unit 400, a first housing structure 310, a second housing structure 320, a first rear surface cover 380, and a second rear surface cover 390. In the disclosure, the display unit 30 may be referred to as a display module or a display assembly. The display unit 30 may include a display 200 and one or more plates or layers 240 on which the display 200 is seated. In an embodiment, the plate 240 may be disposed between the display 200 and the bracket assembly 40. The display 200 may be disposed on at least a portion of one surface (for example, the upper surface in FIG. 4) of the plate 240. The plate 240 may be formed in a shape corresponding to the display 200. For example, some areas of the plate 240 may be formed in a shape corresponding to the notch 204 of the display 200.

The bracket assembly 40 may include a first bracket 393, a second bracket 394, a hinge structure 395 disposed between the first bracket 393 and the second bracket 394, a hinge cover 330 to cover the hinge structure when it is viewed from the outside, and a wire member (for example, a flexible printed circuit (FPC)) crossing over the first bracket 393 and the second bracket 394.

In an embodiment, the bracket assembly 40 may be disposed between the plate 240 and the board unit 400. For example, the first bracket 393 may be disposed between the first area 201 of the display 200 and a first board 410. The second bracket 394 may be disposed between the second area 202 of the display 200 and a second board 420.

In an embodiment, the wire member and at least a portion of the hinge structure 395 may be disposed inside the bracket assembly 40. The wire member may be disposed in a direction (for example, an x-axis direction) of crossing over the first bracket 393 and the second bracket 394. The wire member may be disposed in a direction (for example, the x-axis direction) perpendicular to a folding axis (for example, the y-axis or the folding axis A of FIG. 2) of the folding area 103 of the electronic device 20.

As mentioned above, the board unit 400 may include the first board 410 disposed on the first bracket 393 side, and the second board 420 disposed on the second bracket 394 side. The first board 410 and the second board 420 may be disposed in a space formed by the bracket assembly 40, the first housing structure 310, the second housing structure 320, the first rear surface cover 380, and the second rear surface cover 390. Components for implementing various functions of the electronic device 20 may be mounted on the first board 410 and the second board 420.

The first housing structure 310 and the second housing structure 320 may be assembled with each other to be coupled to both sides of the bracket assembly 40 with the display unit 30 being coupled to the bracket assembly 40. As will be described below, the first housing structure 310 and the second housing structure 320 may slide from both sides of the bracket assembly 40 and may be coupled with the bracket assembly 40.

In an embodiment, the first housing structure 310 may include a first rotation support surface 312, and the second housing structure 320 may include a second rotation support surface 322 corresponding to the first rotation support surface 312. The first rotation support surface 312 and the second rotation support surface 322 may include curved surfaces corresponding to curved surfaces included in the hinge cover 330.

In an embodiment, when the electronic device 10 is in the flat state (for example, the electronic device of FIG. 2), the first rotation support surface 312 and the second rotation support surface 322 may cover the hinge cover 330, such that the hinge cover 330 is not exposed to the rear surface of the electronic device 20 or is exposed to the minimum. On the other hand, when the electronic device 10 is in the folded state (for example, the electronic device of FIG. 2), the first rotation support surface 312 and the second rotation support surface 322 may rotate along the curved surface included in the hinge cover 330, such that the hinge cover 330 is exposed to the rear surface of the electronic device 20 to the maximum.

Figure 5:
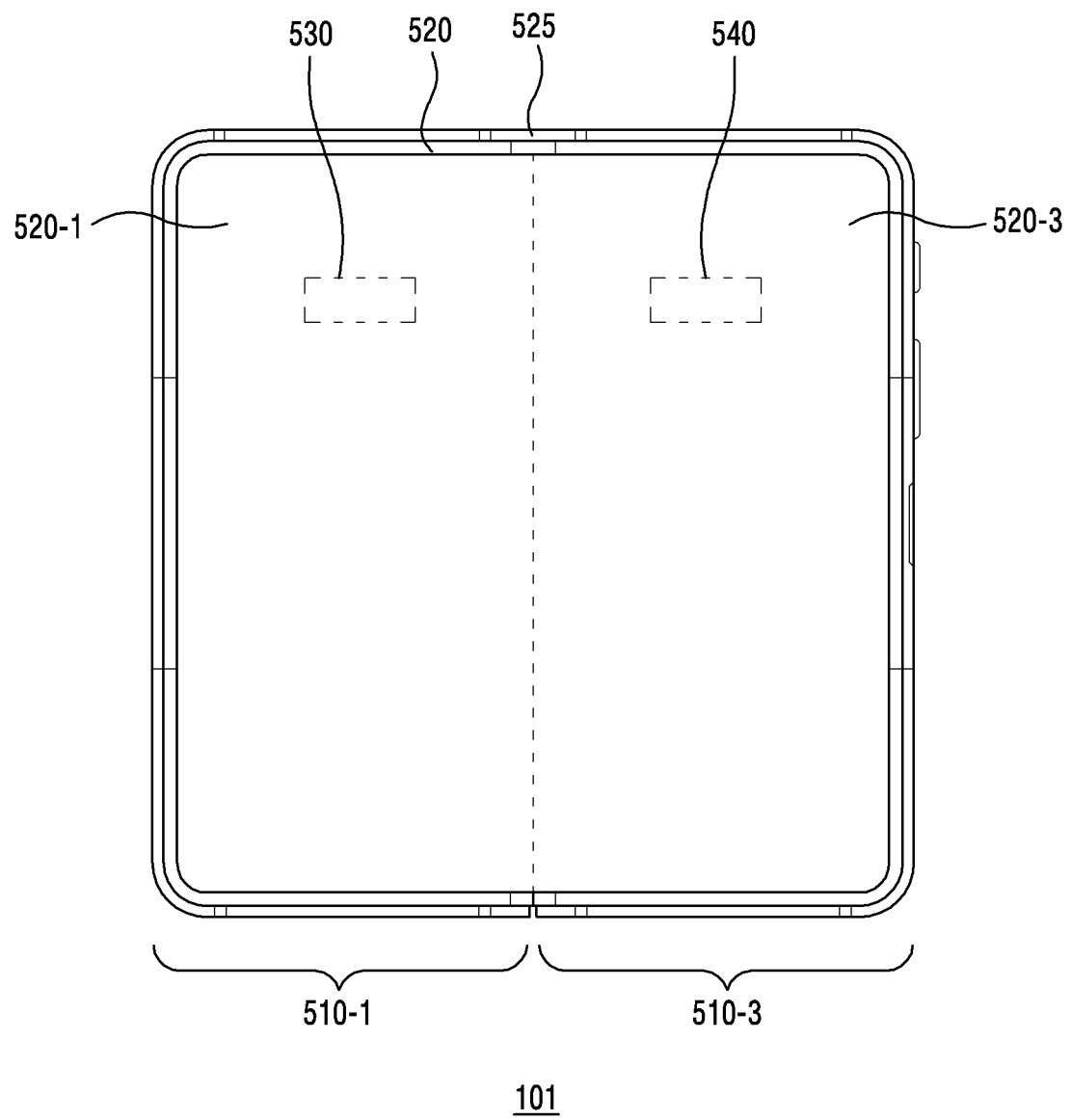
FIG. 5 is a view illustrating a front view of an electronic device according to an embodiment.

FIG. 5 is a view illustrating a front view of an electronic device 101 according to an embodiment.

Referring to FIG. 5, in an embodiment, the electronic device 101 may be an electronic device including a foldable display. In an embodiment, the electronic device 101 may be the same as or similar to the electronic device 101 of FIG. 1 or the electronic device 20 of FIGS. 2 to 4 at least in part.

In an embodiment, the electronic device 101 may be a foldable electronic device that folds out, meaning that the foldable display of the electronic device 101 is exposed when the electronic device 101 (or housing) is in a fully unfolded state. However, this should not be considered as limiting. For example, the electronic device 101 may be a foldable electronic device 101 that folds in, meaning that the foldable display of the electronic device 101 is folded in half but is still exposed when the electronic device 101 is in a fully folded state.

In the following descriptions, it is assumed that the electronic device 101 is the foldable electronic device that folds out, but the disclosure can be applied in the same or similar way if the electronic device 101 folds in.

In an embodiment, FIG. 5 may illustrate a front view of the electronic device 101 in a fully unfolded state.

In an embodiment, the electronic device 101 may include a first housing 510-1, a second housing 510-3, a hinge unit 525, a display 520, a first speaker 530, and a second speaker 540.

In an embodiment, the first housing 510-1, the second housing 510-3, the hinge unit 525, and the display 520 may correspond to the first housing structure 310, the second housing structure 320, the hinge cover 330, and the display 200 of FIGS. 2 to 4, respectively.

In an embodiment, the first housing 510-1 and the second housing 510-3 may be connected with each other. For example, one side surface of the first housing 510-1 and one side surface of the second housing 510-3 may be connected with each other. In an embodiment, the first housing 510-1 and the second housing 510-3 may be connected by the hinge unit 525. In an embodiment, the first housing 510-1 and the second housing 510-3 may be pivotably or rotatably connected via the hinge unit 525.

In an embodiment, the display 520 may be exposed to the outside in a first surface (or a first area) of the first housing 510-1 and a second surface (or a second area) of the second housing 510-3. For example, the display 520 may be disposed on the first housing 510-1 and the second housing 510-3 across the hinge unit 525.

In an embodiment, the display 520 may be a foldable display. In an embodiment, the display 520 may be folded or unfolded by the first housing 510-1 and the second housing 510-3 being rotated with reference to the hinge unit 525. In the following descriptions, it will be illustrated that the display 520 is folded or unfolded, but this should not be considered as limiting. For example, the display 520 may be implemented as a bendable display, and aspects of the instant disclosure may also be applied to embodiments having bendable displays.

In an embodiment, when the first housing 510-1 and the second housing 510-3 are folded to form a certain angle with reference to the hinge unit 525, the first portion 520-1 of the display (hereinafter, referred to as the "first portion of the display") and the second portion 520-3 of the display (hereinafter, referred to as the "second portion of the display") may be folded to form the certain angle with reference to the hinge unit 525. For example, in FIG. 5, the first portion 520-1 of the display may be the left portion of the display 520 with reference to an axis of the hinge unit 525 (for example, the portion illustrated by the dashed line of FIG. 2), and the second portion 520-3 of the display may be a right portion of the display 520 with reference to the axis of the hinge unit 525.

In an embodiment, the first portion 520-1 of the display 520 may be exposed to the outside through the first surface of the first housing 510-1 (or may be disposed on the first surface of the first housing 510-1), and the second portion 520-3 of the display 520 may be exposed to the outside through the second surface of the second housing 510-3 (or may be disposed on the second surface of the second housing 510-3). In an embodiment, when the electronic device 101 is in the fully folded state, the direction in which the first surface of the first housing 510-1 faces and the direction in which the second surface of the second housing 510-3 faces may be opposite to each other. In an embodiment, when the electronic device 101 is in the fully unfolded state, the direction in which the first surface of the first housing 510-1 faces and the direction in which the second surface of the second housing 510-3 faces may be the same.

In an embodiment, the first speaker 530 may be disposed within the first housing 510-1.

In an embodiment, the first speaker 530 may be a piezo speaker (or a piezo-electric speaker). For example, the first speaker 530 may be a speaker that, when power is supplied, outputs sound (audio data) by vibrating at least a portion of the display 520 (for example, the first portion 520-1 of the display).

In an embodiment, the first speaker 530 may output sound having directionality in the first direction in which the first surface of the first housing 510-1 is facing. For example, the first speaker 530 may be implemented to output sound of a designated amount or more (for example, about 90% or more of an output volume) in the first direction in which the first surface of the first housing 510-1 is facing. However, this should not be considered as limiting, and for example the first speaker 530 may be implemented to output sound having directionality in the first direction in which the first surface of the first housing 510-1 is facing and in the opposite direction of the first direction.

In an embodiment, the first speaker 530 and the display 520 which serves as a vibration plate may be coupled to each other and may be referred to as a display panel speaker.

In an embodiment, the second speaker 540 may be disposed within the second housing 510-3.

In an embodiment, the second speaker 540 may include a vibration module (or an actuator). For example, the second speaker 540 may include a vibration module that outputs a sound by vibrating at least a portion of the second housing 510-3.

In an embodiment, the second speaker 540 may output sound having directionality in the second direction in which the second surface of the second housing 510-3 is facing. For example, the second speaker 540 may be implemented to output sound of a designated amount (or sound pressure level) or more in the second direction in which the second surface of the second housing 510-3 facing. However, this should not be considered as limiting, and for example the second speaker 540 may output sound having directionality in the second direction in which the second surface of the second housing 510-3 is facing and in the opposite direction of the second direction.

In an embodiment, the second speaker 540 may perform the operation of outputting a vibration (or a haptic effect) to provide a notification, in addition to the operation of outputting sound. For example, the second speaker 540 may output sound by outputting vibrations having intensities greater than or equal to a designated intensity. The second speaker 540 may output a vibration for providing notification, in which no sound is outputted, by outputting vibrations having intensities less than the designated intensity.

In an embodiment, the second speaker 540 may be referred to as a vibration receiver.

FIG. 5 illustrates that the electronic device 101 includes one first speaker 530 and one second speaker 540, but this should not be considered as limiting. For example, the electronic device 101 may include a plurality of first speakers 530 and/or a plurality of second speakers 540.

Figure 6:
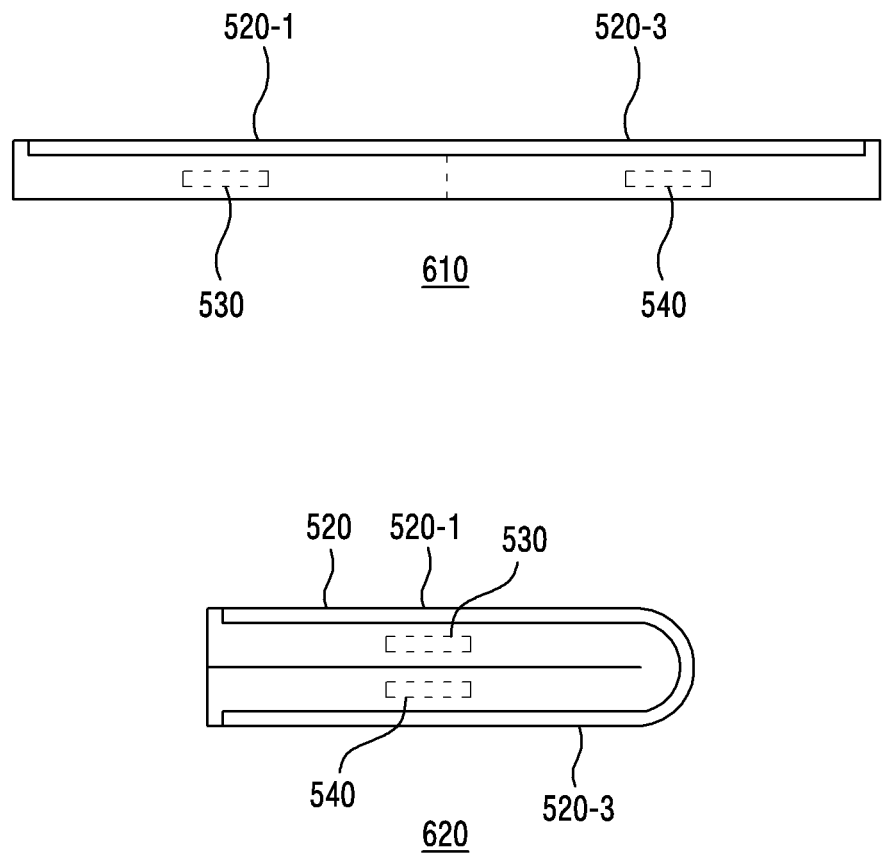
FIG. 6 is a view illustrating a flat state and a folded state of the electronic device according to an embodiment.

FIG. 6 is a view illustrating an unfolded state and a folded state of the electronic device 101 according to an embodiment.

Referring to FIG. 6, drawing 610 may show the electronic device 101 in the fully unfolded state, and drawing 620 may show the electronic device 101 in the fully folded state.

In an embodiment, the first portion 520-1 of the display may be exposed to the outside in the first surface of the first housing 510-1, and the second portion 520-3 of the display may be exposed to the outside in the second surface of the second housing 510-3.

In an embodiment, the first speaker 530 may be included in the first housing 510-1, and the second speaker 540 may be disposed within the second housing 510-3.

In an embodiment, as shown in drawing 610, when the electronic device 101 is in the fully unfolded state, the direction in which the first surface of the first housing 510-1 is facing and the direction in which the second surface of the second housing 510-3 is facing may be the same.

In an embodiment, when the electronic device 101 is in the fully folded state as shown in drawing 620, the direction in which the first surface of the first housing 510-1 is facing and the direction in which the second surface of the second housing 510-3 is facing may be opposite to each other.

Figure 7:
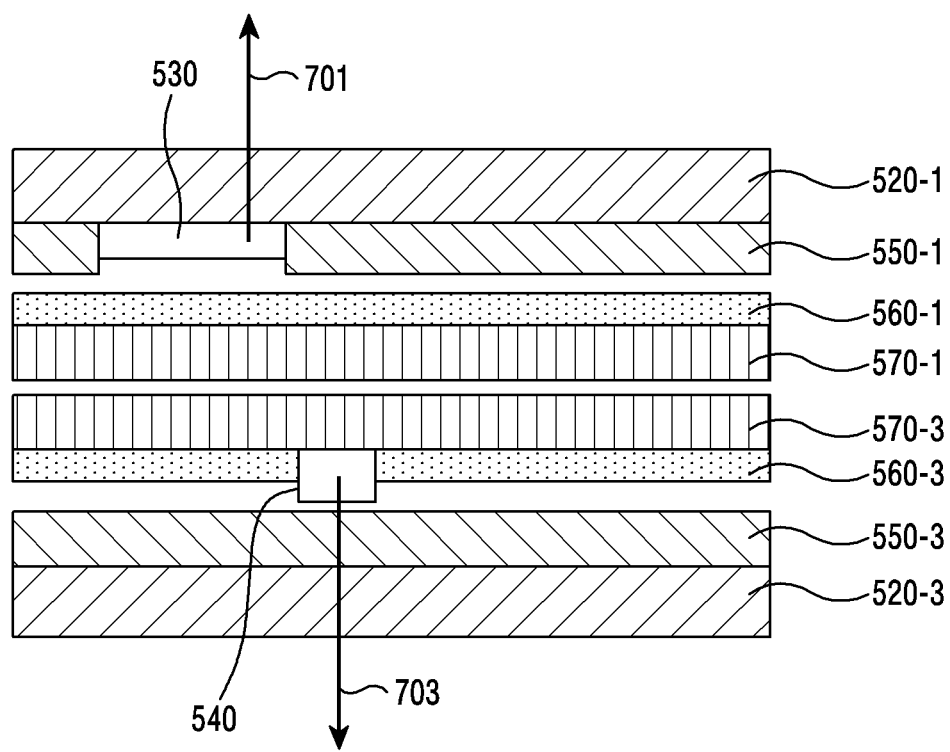
FIG. 7 is a view illustrating a plurality of speakers according to an embodiment.

FIG. 7 is a view illustrating a plurality of speakers according to an embodiment. For example, FIG. 7 may be a view to explain the positions in which the first speaker 530 and the second speaker 540 are disposed.

Referring to FIG. 7, in an embodiment, FIG. 7 may be a view illustrating a portion of the side surface of the electronic device 101 which is in the fully folded state.

In an embodiment, the first portion 520-1 of the display, the first speaker 530, a first bracket 550-1, a first printed circuit board (PCB) 560-1, and a first rear case 570-1 may be disposed within the first housing 510-1.

In an embodiment, the first speaker 530 may be coupled (or attached) to at least a portion of the first portion 520-1 of the display. In an embodiment, the first speaker 530 may output sound by vibrating at least a portion of the first portion 520-1 of the display. In an embodiment, the first speaker 530 may output sound having directionality in the first direction in which the first surface of the first housing 510-1 is facing. For example, the first speaker 530 may output sound having a direction 701 from the first speaker 530 toward the first portion 520-1 of the display. However, this should not be considered as limiting.

In an embodiment, the first speaker 530 may be a piezo speaker that is implemented by a piezo-electric element.

In an embodiment, the second portion 520-3 of the display, the second speaker 540, a second bracket 550-3, a second PCB 560-3, and a second rear case 570-3 may be disposed within the second housing 510-3.

In an embodiment, the second speaker 540 may be disposed between the second bracket 550-3 and the second rear case 570-3. In an embodiment, the second speaker 540 may output sound by vibrating at least a portion of the second bracket 550-3 and at least a portion of the second rear case 570-3. In an embodiment, the second speaker 540 may output sound having directionality in the second direction in which the second surface of the second housing 510-3 is facing. For example, the second speaker 540 may output sound having a direction from the second rear case toward the second bracket 550-3. For example, the second speaker 540 may output sound having a direction 703 from the second rear case 570-3 toward the second bracket 550-3. However, this should not be considered as limiting.

In an embodiment, the second speaker 540 may be set to have directionality from the second rear case 570-3 toward the second bracket 550-3.

In an embodiment, the second speaker 540 may include a vibration module (or an actuator).

Figure 8:
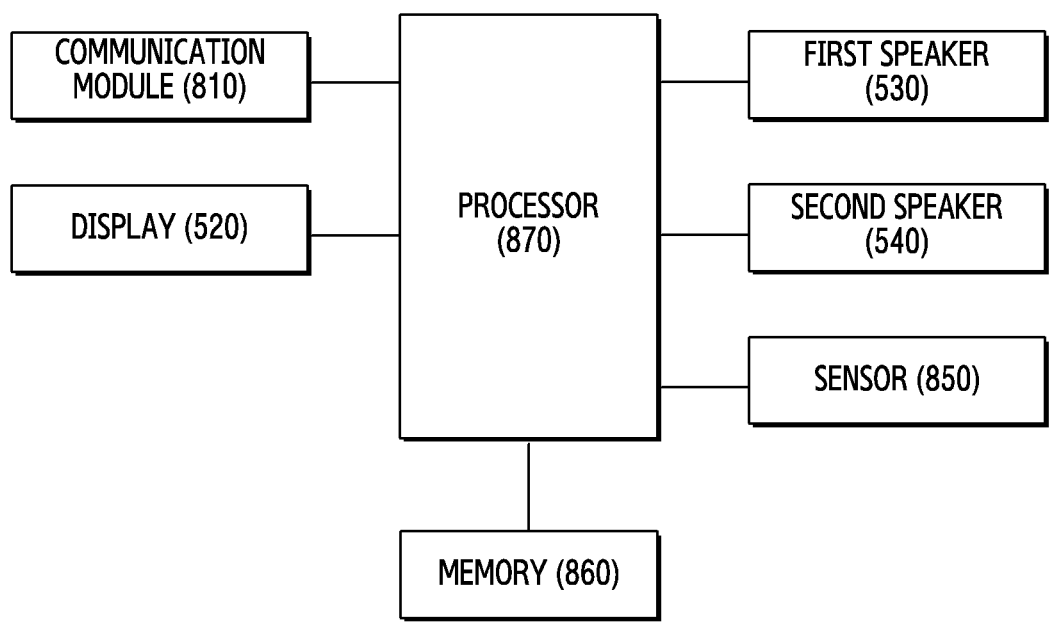
FIG. 8 is a block diagram of an electronic device which provides audio data according to an embodiment.

FIG. 8 is a block diagram of an electronic device 101 which provides audio data according to an embodiment.

Referring to FIG. 8, in an embodiment, the electronic device 101 may include a communication module 510, a display 520, a first speaker 530, a second speaker 540, a sensor 850, a memory 860, and a processor 870.

In an embodiment, the communication module 810 may cause the electronic device 101 to communicate with other electronic devices (for example, the electronic devices 102, 104 or the server 108).

For example, the communication module 810 may transmit and receive audio data to cause the electronic device 101 to hold a telephone call with another electronic device (for example, the electronic device 102). In another example, the communication module 810 may receive audio data from other electronic devices (for example, the electronic devices 102, 104 or the server 108). However, this should not be considered as limiting.

In an embodiment, the communication module 810 may be the same as or similar to the communication module 190 of FIG. 1 at least in part, and thus a detailed description thereof is omitted.

In an embodiment, the display 520 may output (or display) various data (or information).

In an embodiment, the display 520 may be the same as or similar to the display device 160 of FIG. 1 and the displays 200, 520 of FIGS. 5 to 7 at least in part, and thus a detailed description thereof is omitted.

In an embodiment, the first speaker 530 and the second speaker 540 may output audio data. In an embodiment, each of the first speaker 530 and the second speaker 540 may be the same as or similar to the sound output device 155 of FIG. 1 at least in part. In an embodiment, the first speaker 530 and the second speaker 540 may be the same as or similar to the first speaker 530 and the second speaker 540 of FIGS. 5 to 7 at least in part, respectively, and thus a detailed description thereof is omitted.

In an embodiment, the sensor 850 may include at least one sensor 850 to perform various functions.

In an embodiment, the sensor 850 may acquire (or detect) information regarding a state of the electronic device 101.

In an embodiment, the sensor 850 may acquire information indicating that a portion of user's body contacts or touches or is in proximity of or hovers over the first surface of the first housing 510-1 or the second surface of the second housing 510-3.

In an embodiment, the sensor 850 may include a capacitive sensor (for example, a capacitive touch sensor). The sensor 850 may acquire information indicating that user's ear contacts (or touches) or is in proximity of the first surface of the first housing 510-1 or the second surface of the second housing 510-3. For example, when user's ear contacts or is in proximity of the electronic device 101, the sensor 850 disposed in the first housing 510-1 and the second housing 510-3 may acquire information regarding a distribution (or a shape) of capacitance (or change in capacitance) indicating the shape of user's ear (or the shape of user's hair). In another example, the sensor 850 disposed in the first housing 510-1 and the second housing 510-3 may acquire information regarding an intensity of capacitance (or a change in the intensity of capacitance) caused by the user's body contacting or being in proximity of the electronic device 101.

In an embodiment, the sensor 850 may include at least one of a proximity sensor or an illuminance sensor. The sensor 850 may acquire information indicating that a portion of user's body contacts or is in proximity of the first surface of the first housing 510-1 or the second surface of the second housing 510-3.

In an embodiment, the sensor 850 may include an image sensor (for example, the camera module 180 of FIG. 1 or an infrared sensor). The sensor 850 may acquire information indicating that a portion of user's body contacts or is in proximity of the first surface of the first housing 510-1 or the second surface of the second housing 510-3.

In an embodiment, the sensor 850 may include a grip sensor. The sensor 850 may acquire information indicating that at least a portion of the electronic device 101 is gripped by a user. For example, the grip sensor may acquire information indicating a user's grip state on a side surface of the electronic device 101. However, this should not be considered as limiting.

In an embodiment, the sensor 850 may acquire information regarding a state of the electronic device 101 with respect to a flat surface or the ground. For example, the sensor 850 (for example, an acceleration sensor, a gyro sensor, a proximity sensor, an illuminance sensor, or a combination of these) may acquire information regarding whether the first housing 510-1 or the second housing 510-3 of the electronic device 101 is placed facedown to the ground.

In an embodiment, the sensor 850 may acquire information regarding the folded or unfolded state of the electronic device 101. For example, the sensor 850 may acquire information regarding the fully folded state of the electronic device 101, the fully unfolded state of the electronic device 101, or the intermediate state in which the first housing 510-1 and the second housing 510-3 are folded to form a certain angle. In another example, the sensor 850 may acquire information regarding an angle between the first housing 510-1 and the second housing 510-3 with respect to the hinge unit 525. In an embodiment, the sensor 850 may be implemented by at least one of a hall sensor, a load cell, an infrared sensor, a pressure sensor, or an electromagnetic sensor.

In an embodiment, the sensor 850 may be the same as or similar to the sensor module 176 of FIG. 1 at least in part.

In an embodiment, the memory 860 may store a variety of information for providing audio data.

In an embodiment, the memory 860 may store audio data that can be outputted through at least one of the first speaker 530 or the second speaker 540.

In an embodiment, the memory 860 may store data related to an operation for providing audio data.

However, the data stored in the memory 860 is not limited to the above-described example.

In an embodiment, the memory 860 may be the same as or similar to the memory 130 of FIG. 1 at least in part.

In an embodiment, the processor 870 may perform an overall operation for providing audio data.

The operation that the processor 870 performs to provide audio data will be described in detail below with reference to FIGS. 9 to 14.

In an embodiment, the electronic device 101 may further include additional components not illustrated in FIG. 8. For example, the electronic device 101 may further include the first housing 510-1, the second housing 510-3, and the hinge unit 525 which are illustrated in FIG. 5 or 7. In another example, the electronic device 101 may further include a microphone for acquiring sound from the surroundings of the electronic device 101 (for example, sound from a user). In still another example, the electronic device 101 may further include at least some of the components illustrated in FIG. 1.

In an embodiment, the electronic device 101 may not include some of the components illustrated in FIG. 8. For example, the electronic device 101 may not include the communication module 810 or some of the sensors illustrated in FIG. 8 according to an embodiment.

In an embodiment, FIGS. 5 to 8 illustrate the electronic device 101 including the foldable display, but this should not be considered as limiting. For example, the electronic device 101 may be an electronic device that includes a double-side display in which displays are disposed on both surfaces of the housing. The electronic device 101 including the double-side display may implement the instant disclosure in the same or similar way as the electronic device including the foldable display shown in FIGS. 5 to 8, and will be described in detail below with reference to FIG. 14.

The electronic device 101 according to an embodiment of the disclosure may include: a housing including a first housing 510-1 having a first surface facing in a first direction, and a second housing 510-3 having a second surface facing in a second direction; a hinge unit 525 rotatably connected to the first housing 510-1 and the second housing 510-3; a display 520 exposed to an outside through the first surface of the first housing 510-1 and the second surface of the second housing 510-3; a first speaker 530 disposed within the first housing 510-1; a second speaker 540 disposed within the second housing 510-3; at least one sensor 850; a processor 870 operatively connected with the first speaker 530, the second speaker 540, and the at least one sensor 850; and a memory 860 operatively connected with the processor 870, and the memory may store instructions that, when being executed, cause the processor 870 to receive an event related to audio data, to identify a state of the electronic device 101, based on information acquired through the at least one sensor 850, to determine at least one speaker to output the audio data from among the first speaker 530 and the second speaker 540, based on the state of the electronic device 101, and to output the audio data through the at least one speaker.

In an embodiment, the instructions may cause the processor to identify, between the first surface and the second surface, a surface that a user contacts or is in proximity of, based on information acquired through the at least one sensor 850.

In an embodiment, the instructions may cause the processor to determine a speaker corresponding to the identified surface as the at least one speaker to output the audio data, from among the first speaker 530 and the second speaker 540.

In an embodiment, the instructions may cause the processor to identify whether the electronic device 101 is placed face down to the ground, based on information acquired through the at least one sensor 850, and, when it is identified that the electronic device 101 is placed face down to the ground, to determine, from among the first speaker 530 and the second speaker 540, a speaker corresponding to a surface that does not face the ground from among the first surface and the second surface, as the at least one speaker to output the audio data.

In an embodiment, the instructions may cause the processor to receive an event related to call reception, to output the audio data through the first speaker 530, and, while outputting the audio data through the first speaker 530, to determine whether to output the audio data through the second speaker 540 in addition to the first speaker 530, based on a state of the electronic device.

In an embodiment, when it is determined that the audio data is to be outputted through the second speaker 540, in addition to the first speaker 530, the instructions may cause the first speaker 530 and the second speaker 540 to output the audio data at a same frequency.

In an embodiment, the instructions may cause the processor to determine a level of the audio data outputted through the determined at least one speaker, based on the state of the electronic device 101.

In an embodiment, the instructions may cause the processor to identify whether the state of the electronic device 101 is changed while outputting the audio data through the determined at least one speaker, and to determine at least one speaker to output the audio data from among the first speaker 530 and the second speaker 540, based on the changed state of the electronic device 101.

In an embodiment, the first speaker 530 may include a piezo-electric speaker having directionality in the first direction.

In an embodiment, the second speaker 540 may include a vibration module having directionality in the second direction.

Figure 9:
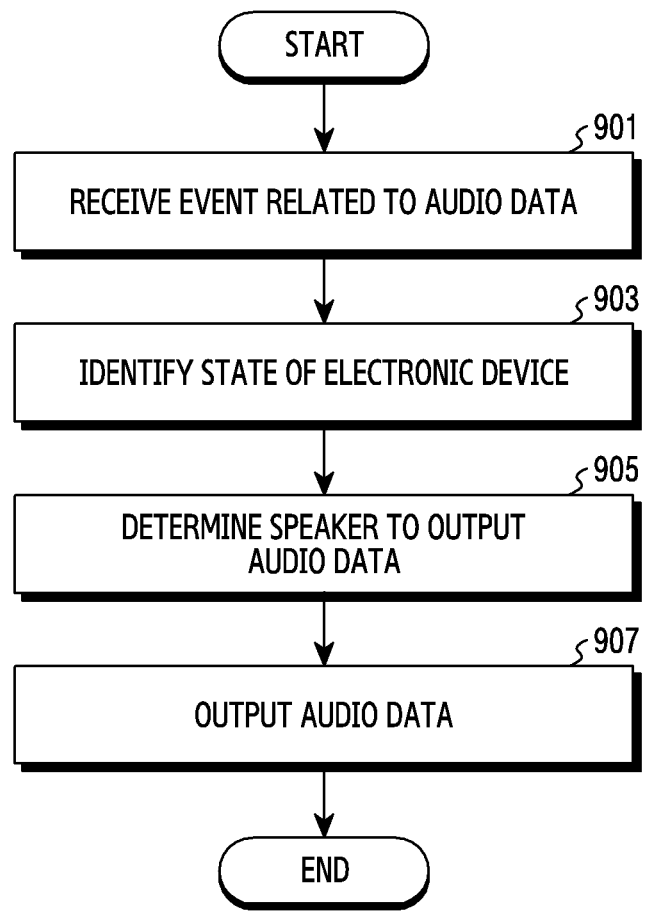
FIG. 9 is a flowchart illustrating a method for providing audio data according to an embodiment.

FIG. 9 is a flowchart illustrating a method for providing audio data according to an embodiment.

Referring to FIG. 9, in operation 901, the processor 870 in an embodiment may receive an event related to audio data.

In an embodiment, the processor 870 may receive an event indicating that a call is received from another electronic device (for example, the electronic device 102) (or indicating call reception). In an embodiment, after receiving the event indicating that the call is received from another electronic device, the processor 870 may receive an input for connecting the telephone call from a user. For example, after receiving the event indicating that the call is received from another electronic device, the processor 870 may receive a user input for receiving voice data from the other electronic device. In an embodiment, when the user input for receiving voice data from the other electronic device is received, the processor 870 may output voice data received from the other electronic device through the first speaker 530 or the second speaker 540. For example, the processor 870 may output the voice data through a default speaker (for example, the first speaker 530).

In an embodiment, the processor 870 may receive an event indicating that an input for outputting audio data (for example, music data) is received. However, the event related to the audio data is not limited to the above-described examples.

In operation 903, the processor 870 in an embodiment may identify a state of the electronic device 101, based on information received from the sensor 850.

In an embodiment, the processor 870 may receive, from the sensor 850, information indicating that a portion of user's body contacts (or touches) or is in proximity of the first surface of the first housing 510-1 or the second surface of the second housing 510-3. The processor 870 may identify which of the first surface of the first housing 510-1 or the second surface of the second housing 510-3 is the surface that the portion of user's body contacts or is in proximity of, based on the received information.

For example, the processor 870 may receive, from the sensor 850 (for example, a capacitive sensor), information regarding a distribution (or shape) of capacitance (or change in capacitance) indicating the shape of user's ear (or the shape of user's hair). When the distribution of capacitance matches a designated distribution, the processor 870 may identify which of the first surface of the first housing 510-1 and the second surface of the second housing 510-3 is the surface where the distribution of capacitance is caused (or is generated).

In another example, the processor 870 may receive, from the sensor 850 (for example, a capacitive sensor), information regarding an intensity of capacitance (or a change in the capacitance intensity) caused by user's body contacting or being in proximity of the electronic device 101. The processor 870 may identify which of the first surface of the first housing 510-1 and the second surface of the second housing 510-3 is the surface where capacitance of a designated intensity or greater is caused.

In an embodiment, the processor 870 may receive, from the sensor 850 (for example, a proximity sensor or an illuminance sensor), information indicating that a portion of user's body contacts or is in proximity of the first surface of the first housing 510-1 or the second surface of the second housing 510-3. The processor 870 may identify which of the first surface of the first housing 510-1 and the second surface of the second housing 510-3 is the surface that the portion of user's body contacts or is in proximity of, based on the received information.

In an embodiment, between the first surface of the first housing 510-1 and the second surface of the second housing 510-3, the processor 870 may determine which surface a portion of user's body is in closest proximity, based on information received from the sensor 850 (for example, a capacitive sensor, a proximity sensor, or an illuminance sensor).

In an embodiment, the processor 870 may receive information regarding a state of the electronic device 101 with respect to the ground from the sensor 850. For example, the processor 870 may identify whether the first surface of the first housing 510-1 of the electronic device 101 or the second surface of the second housing 510-3 is placed face down on the ground, based on information received from the sensor 850 (for example, an acceleration sensor, a gyro sensor, a proximity sensor, an illuminance sensor, or a combination of these).

In an embodiment, the processor 870 may identify whether at least a portion of the electronic device 101 is gripped by a user, based on information received from the sensor 850 (for example, a grip sensor).

In an embodiment, the processor 870 may receive information regarding whether the electronic device 101 is folded or unfolded, from the sensor 850 (for example, at least one of a hall sensor, a load cell, an infrared sensor, a pressure sensor, or an electromagnetic sensor). The processor 870 may acquire information regarding the fully folded state of the electronic device 101, the fully unfolded state of the electronic device 101, or the intermediate state in which the first housing 510-1 and the second housing 510-3 are folded to form a certain angle, based on information received from the sensor 850.

In FIG. 9, it is illustrated that operation 901 of receiving the event related to the audio data precedes operation 903 of identifying the state of the electronic device 101, but this should not be considered as limiting. For example, operation 903 of identifying the state of the electronic device 101 may precede operation 901 of receiving the event related to the audio data.

In operation 905, the processor 870 in an embodiment may determine at least one speaker to output the audio data from among the first speaker 530 and the second speaker 540, based on the state of the electronic device 101.

In an embodiment, the first speaker 530 may be disposed within the first housing 510-1 and the second speaker 540 may be disposed within the second housing 510-3. In an embodiment, since the first speaker 530 and the second speaker 540 are the same as the first speaker 530 and the second speaker 540 of FIGS. 5 to 8, detailed descriptions of the first speaker 530 and the second speaker 540 are omitted.

In an embodiment, between the first surface of the first housing 510-1 and the second surface of the second housing 510-3, the processor 870 may determine the surface that a portion of user's body contacts or is in proximity of, and determine the speaker corresponding to that surface as the speaker to output audio data (for example, voice data).

In an embodiment, when it is identified that the electronic device 101 is in the fully folded state, between the first surface of the first housing 510-1 and the second surface of the second housing 510-3, the processor 870 may determine the speaker corresponding to the surface that a portion of user's body contacts or is in proximity of, as the speaker to output audio data (for example, voice data). In an embodiment, when it is identified that the electronic device 101 is in the fully unfolded state or the first housing 510-1 and the second housing 510-3 are folded to form a certain angle in the intermediate state, the processor 870 may determine a speaker (for example, the first speaker 530) that is set by default (or has a priority) from among the first speaker 530 and the second speaker 540, as the speaker to output audio data.

In an embodiment, when it is identified that the electronic device 101 is gripped by the user and the electronic device 101 is in the fully folded state, between the first surface of the first housing 510-1 and the second surface of the second housing 510-3, the processor 870 may determine the speaker corresponding to the surface that a portion of user's body contacts or is in proximity of, as the speaker to output audio data (for example, voice data).

In the above-described example, it is illustrated that, when the electronic device 101 is in the fully folded state, between the first surface of the first housing 510-1 and the second surface of the second housing 510-3, the speaker corresponding to the surface that a portion of user's body contacts or is in proximity of, is determined as the speaker to output audio data (for example, voice data), but this should not be considered as limiting. For example, when it is identified that the electronic device 101 is in the fully unfolded state or the first housing 510-1 and the second housing 510-3 are folded to form a certain angle, between the first surface of the first housing 510-1 and the second surface of the second housing 510-3, the processor 870 may determine the speaker corresponding to the surface in which capacitance intensity is the strongest (or greatest) due to the contact or proximity of a portion of user's body, as the speaker to output audio data (for example, voice data).

In an embodiment, when it is identified that the electronic device 101 is in the fully folded state and any one of the first surface of the first housing 510-1 of the electronic device 101 and the second surface of the second housing 510-3 is placed facedown to the ground, the processor 870 may determine the speaker corresponding to the surface that is not facing the ground as the speaker to output audio data. However, this should not be considered as limiting. For example, when it is identified that the first housing 510-1 and the second housing 510-3 are folded to form a certain angle, and the first surface of the first housing 510-1 of the electronic device 101 or the second surface of the second housing 510-3 is placed facedown to the ground, the processor 870 may determine the speaker corresponding to the surface that does not face the ground as the speaker to output audio data.

In an embodiment, the processor 870 may determine a level (or volume) of audio data to be outputted, based on the state of the electronic device 101.

For example, when it is identified that a portion of user's body contacts at least one of the first surface of the first housing 510-1 or the second surface of the second housing 510-3, or is in proximity within a designated distance, the processor 870 may determine to output audio data having a level lower than or equal to a designated level (or audio data for operating in an earphone mode).

In another example, when it is identified that a portion of user's body is not positioned within the designated distance from at least one of the first surface of the first housing 510-1 or the second surface of the second housing 510-3, the processor 870 may determine to output audio data having a level higher than or equal to the designated level (or audio data for operating in a speakerphone mode).

In an embodiment, the operation of the processor 870 determining the level of the audio data to be outputted may be performed after the operation of determining at least one speaker to output the audio data. However, this should not be considered as limiting. For example, the operation of the processor 870 determining the level of the audio data to be outputted may be performed before the operation of determining at least one speaker to output the audio data.

In operation 907, in an embodiment, the processor 870 may output the audio data through the at least one determined speaker. For example, the processor 870 may output the audio data through at least one speaker determined from among the first speaker 530 or the second speaker 540. In another example, the processor 870 may output the audio data having the determined audio level through at least one speaker determined from among the first speaker 530 or the second speaker 540.

In an embodiment, when the processor 870 outputs the audio data through the at least one determined speaker, the processor 870 may deactivate at least some of the sensors 850. For example, when the processor 870 outputs the audio data through the at least one determined speaker, the processor 870 may deactivate the capacitive sensor for detecting contact or proximity between the electronic device 101 and the user. However, the deactivated sensor is not limited to the capacitive sensor.

In an embodiment, the processor 870 may output the audio data through one or more additional speakers, in addition to at least one of the first speaker 530 or the second speaker 540 although this operation is not illustrated in FIG. 9. For example, the processor 870 may identify that the first housing 510-1 and the second housing 510-3 are folded to form a certain angle and the first surface of the first housing 510-1 of the electronic device 101 or the second surface of the second housing 510-3 is placed face down on the ground. The processor 870 may output the audio data (or stereo audio data) through a coil-type speaker (or an acoustic speaker) disposed on a lower end (or an upper end) of the housing of the electronic device 101, along with the speaker corresponding to the surface that is not facing the ground.

In an embodiment, while outputting the audio data through the at least one determined speaker, the processor 870 may iteratively perform operations 903 to 907 although this operation is not illustrated in FIG. 9. For example, when the state of the electronic device 101 is changed, the processor 870 may determine at least one speaker to output the audio data, based on the changed state of the electronic device 101, and may output the audio data through the at least one determined speaker.

Figure 10:
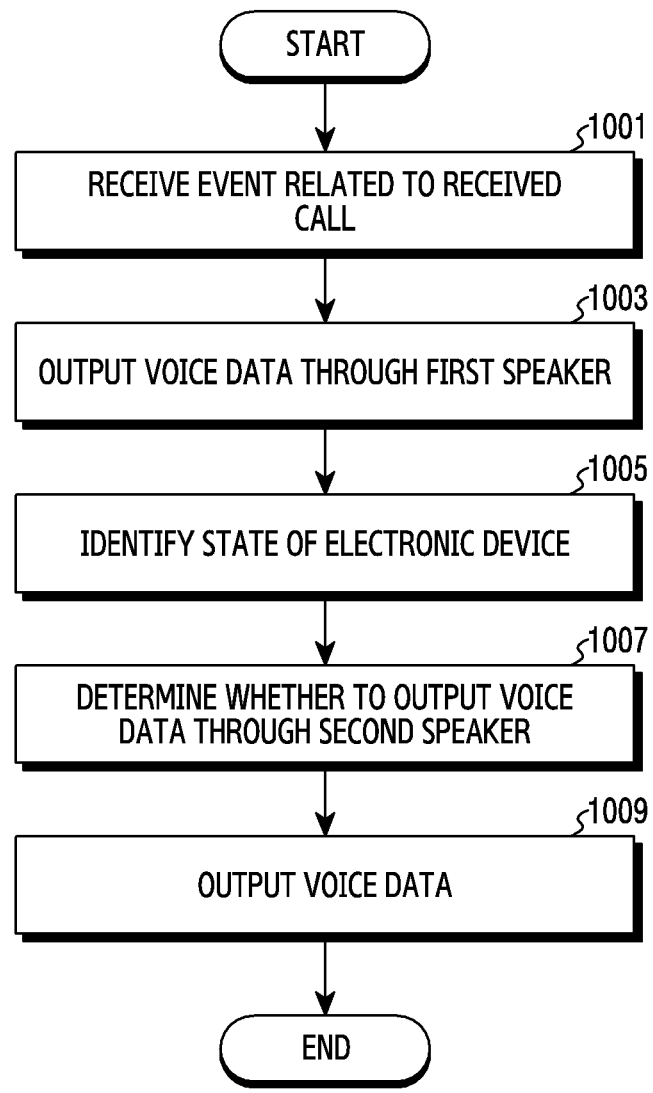
FIG. 10 is a flowchart illustrating a method for providing audio data to perform a telephone call according to an embodiment.

FIG. 10 is a flowchart illustrating a method for providing audio data to perform a telephone call according to an embodiment.

Referring to FIG. 10, in operation 1001, the processor 870 in an embodiment may receive an event related to a received call.

In an embodiment, the processor 870 may receive an event indicating that a call is received from another electronic device (for example, the electronic device 102) (or an event indicating reception of a call). In an embodiment, after receiving the event indicating that the call is received from another electronic device, the processor 870 may receive an input for connecting the telephone call from a user. For example, after receiving the event indicating that the call is received from another electronic device, the processor 870 may receive a user input for receiving voice data from another electronic device.

In operation 1003, the processor 870 in an embodiment may output voice data through the first speaker 530. For example, when the user input for receiving voice data from another electronic device is received, the processor 870 may output the voice data through the first speaker 530 which is set by default.

In operation 1005, the processor 870 in an embodiment may identify a state of the electronic device 101, based on information received from the sensor 850.

In an embodiment, the processor 870 may receive, from the sensor 850, information indicating that a portion of user's body contacts (or touches) or is in proximity of the first surface of the first housing 510-1 or the second surface of the second housing 510-3. Between the first surface of the first housing 510-1 and the second surface of the second housing 510-3, the processor 870 may identify the surface that the portion of user's body contacts or is in proximity of, based on the received information.

For example, the processor 870 may receive, from the sensor 850 (for example, a capacitive sensor), information regarding a distribution (or shape) of capacitance (or change in capacitance) indicating the shape of user's ear (or the shape of user's hair). When the distribution of capacitance matches a designated distribution, the processor 870 may identify which of the first surface of the first housing 510-1 and the second surface of the second housing 510-3 is the surface where the distribution of capacitance is caused (or is generated).

In another example, the processor 870 may receive, from the sensor 850 (for example, a capacitive sensor), information regarding an intensity of capacitance (or a change in the capacitance intensity) caused by user's body contacting or being in proximity of the electronic device 101. The processor 870 may identify which of the first surface of the first housing 510-1 and the second surface of the second housing 510-3 is the surface where capacitance of a designated intensity or greater is caused.

In an embodiment, the processor 870 may receive, from the sensor 850 (for example, a proximity sensor or an illuminance sensor), information indicating that a portion of user's body contacts or is in proximity of the first surface of the first housing 510-1 or the second surface of the second housing 510-3. The processor 870 may identify which of the first surface of the first housing 510-1 and the second surface of the second housing 510-3 is the surface that the portion of user's body contacts or is in proximity of, based on the received information.

In an embodiment, the processor 870 may identify whether at least a portion of the electronic device 101 is gripped by the user, based on information received from the sensor 850 (for example, a grip sensor).

In an embodiment, the processor 870 may receive information regarding whether the electronic device 101 is folded or unfolded from the sensor 850 (for example, at least one of a hall sensor, a load cell, an infrared sensor, a pressure sensor, or an electromagnetic sensor). The processor 870 may acquire information regarding the fully folded state of the electronic device 101, the fully unfolded state of the electronic device 101, or the intermediate state in which the first housing 510-1 and the second housing 510-3 are folded to form a certain angle, based on information received from the sensor 850.

FIG. 10 illustrates that operation 1001 of receiving the event related to the received call and operation 1003 of outputting the voice data through the first speaker 530 precede operation 1005 of identifying the state of the electronic device 101, but this should not be considered as limiting. For example, operation 1005 of identifying the state of the electronic device 101 may precede operation 1001 of receiving the event related to the received call or operation 1003 of outputting the voice data through the first speaker 530.

In operation 1007, the processor 870 in an embodiment may determine whether to output audio data through the second speaker 540, based on the state of the electronic device 101. For example, the processor 870 may determine whether to output the voice data through the second speaker 540, in addition to the first speaker 530 which is outputting voice data, based on the state of the electronic device 101.

In an embodiment, the first speaker 530 may be disposed within the first housing 510-1, and the second speaker 540 may be disposed within the second housing 510-3. In an embodiment, since the first speaker 530 and the second speaker 540 are the same as the first speaker 530 and the second speaker 540 of FIGS. 5 to 8, detailed descriptions of the first speaker 530 and the second speaker 540 are omitted.

In an embodiment, when it is identified that a portion of user's body contacts or is in proximity of the second surface of the second housing 510-3, the processor 870 may determine to output the voice data through the second speaker 540 in addition to the first speaker 530.

In an embodiment, when it is identified that a portion of user's body contacts or is in proximity of the first surface of the first housing 510-1, the processor 870 may determine to output the voice data only though the first speaker 530.

In an embodiment, when it is identified that the electronic device 101 is in the fully folded state and a portion of user's body contacts or is in proximity of the second surface of the second housing 510-3, the processor 870 may determine to output the voice data through the second speaker 540 in addition to the first speaker 530.

In an embodiment, when it is identified that the electronic device 101 is in the fully unfolded state or the first housing 510-1 and the second housing 510-3 are folded to form a certain angle, or when it is identified that a portion of user's body contacts or is in proximity of the first surface of the first housing 510-1, the processor 870 may determine to output the voice data only through the first speaker 530.

In an embodiment, when it is identified that the electronic device 101 is gripped by the user and the electronic device 101 is in the fully folded state, and a portion of user's body contacts or is in proximity of the second surface of the second housing 510-3, the processor 870 may determine to output the voice data through the second speaker 540, in addition to the first speaker 530.

In an embodiment, when it is identified that the electronic device 101 is not gripped by the user or the electronic device 101 is in the fully unfolded state or the first housing 510-1 and the second housing 510-3 are folded to form a certain angle, or a portion of user's body contacts or is in proximity of the first surface of the first housing 510-1, the processor 870 may determine to output the voice data only through the first speaker 530.

In an embodiment, when the processor 870 determines to output the voice data through the second speaker 540 in addition to the first speaker 530, the processor 870 may determine a level (for example, a sound pressure level) and a frequency (for example, a sound frequency) of the voice data to be outputted through the second speaker 540. For example, the processor 870 may determine to output voice data through the second speaker 540 that has a level higher than or equal to a designated level and has the same frequency as the frequency of the sound output through the first speaker 530.

In operation 1009, the processor 870 in an embodiment may output the audio data. For example, when the processor 870 determines to output the voice data through the second speaker 540 in addition to the first speaker 530 in operation 707, the processor 870 may output the voice data through the first speaker 530 and the second speaker 540. In another example, when the processor 870 determines to output the voice data only through the first speaker 530 in operation 707, the processor 870 may output the voice data only through the first speaker 530.

In an embodiment, when the processor 870 outputs the audio data through the one or more speakers, the processor 870 may deactivate at least some of the sensors included in the sensor 850. For example, when the processor 870 outputs the audio data through the at least one determined speaker, the processor 870 may deactivate the capacitive sensor 850 used to detect contact or proximity between the electronic device 101 and the user. However, the deactivated sensor 850 is not limited to the capacitive sensor 850.

In an embodiment, while outputting the audio data through the at least one determined speaker, the processor 870 may iteratively perform operations 1005 to 1009 although this operation is not illustrated in FIG. 10. For example, when the state of the electronic device 101 is changed, the processor 870 may determine whether to output the voice data through the second speaker 540, in addition to the first speaker 530, based on the changed state of the electronic device 101, and may output the audio data through the first speaker 530 and the second speaker or only through the first speaker 530.

In an embodiment, when a call is received, the electronic device 101 may output voice data through a speaker which is determined based on a state of the electronic device 101, so that the user of the electronic device 101 can perform the telephone call without having to identify the housing in which the speaker is disposed from among the plurality of housings to hold the telephone call.

Figure 11:
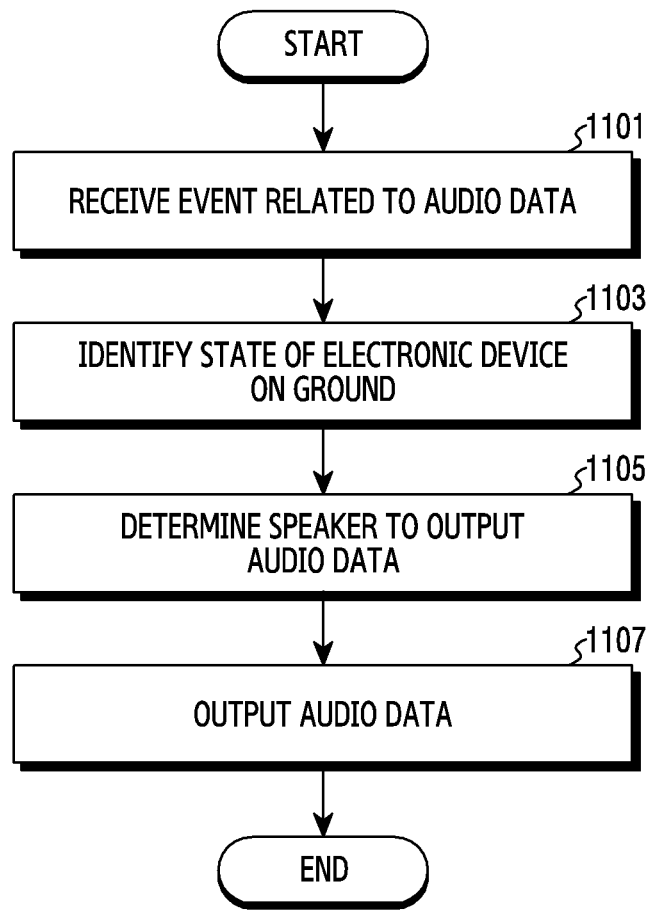
FIG. 11 is a flowchart illustrating a method for providing audio data based on a state in which an electronic device is placed on the ground according to an embodiment.

FIG. 11 is a flowchart illustrating a method for providing audio data based on a state in which the electronic device 101 is placed on the ground according to an embodiment.

Referring to FIG. 11, in operation 1101, the processor 870 in an embodiment may receive an event related to audio data.

In an embodiment, the processor 870 may receive an event indicating that an input for outputting audio data (for example, music data) is received. However, the event related to the audio data is not limited to the above-described example.

In operation 1103, the processor 870 in an embodiment may identify a state of the electronic device 101, based on information received from the sensor 850.

In an embodiment, the processor 870 may receive information regarding a state of the electronic device 101 on the ground from the sensor 850. For example, the processor 870 may identify whether the first surface of the first housing 510-1 of the electronic device 101 or the second surface of the second housing 510-3 is placed face down to the ground, based on information received from the sensor 850 (for example, an acceleration sensor, a gyro sensor, a proximity sensor, an illuminance sensor, or a combination of these).

In an embodiment, the processor 870 may identify whether at least a portion of the electronic device 101 is gripped by a user, based on information received from the sensor 850 (for example, a grip sensor).

In an embodiment, the processor 870 may receive information regarding whether the electronic device 101 is folded or unfolded, from the sensor 850 (for example, at least one of a hall sensor, a load cell, an infrared sensor, a pressure sensor, or an electromagnetic sensor). The processor 870 may acquire information regarding the fully folded state of the electronic device 101, the fully unfolded state of the electronic device 101, or the intermediate state in which the first housing 510-1 and the second housing 510-3 are folded to form a certain angle, based on information received from the sensor 850.

FIG. 11 illustrates that operation 1101 of receiving the event related to the audio data precedes operation 1103 of identifying the state of the electronic device 101, but this should not be considered as limiting. For example, operation 1103 of identifying the state of the electronic device 101 may precede operation 801 of receiving the event related to the audio data.

In operation 1105, the processor 870 in an embodiment may determine at least one speaker to output the audio data from among the first speaker 530 and the second speaker 540, based on the state of the electronic device 101.

In an embodiment, the first speaker 530 may be disposed within the first housing 510-1 and the second speaker 540 may be disposed within the second housing 510-3. In an embodiment, since the first speaker 530 and the second speaker 540 are the same as the first speaker 530 and the second speaker 540 of FIGS. 5 to 8, detailed descriptions of the first speaker 530 and the second speaker 540 are omitted.

In an embodiment, when it is identified that the electronic device 101 is in the fully folded state and the first surface of the first housing 510-1 of the electronic device 101 or the second surface of the second housing 510-3 is placed face down to the ground, the processor 870 may determine the speaker corresponding to the surface that is not facing the ground as the speaker to output audio data. However, this should not be considered as limiting. For example, when it is identified that the first housing 510-1 and the second housing 510-3 are folded to form a certain angle, and the first surface of the first housing 510-1 of the electronic device 101 or the second surface of the second housing 510-3 is placed face down to the ground, the processor 870 may determine the speaker corresponding to the surface that is not facing the ground as the speaker to output audio data.

In an embodiment, the processor 870 may determine a level (or volume) of audio data to be outputted, based on the state of the electronic device 101.

For example, when the processor 870 determines the speaker corresponding to the surface that is not facing the ground as the speaker to output the audio data, the processor 870 may determine to output audio data having a level higher than or equal to a designated level (or audio data for operating in a speakerphone mode) through the determined speaker.

In an embodiment, the operation of the processor 870 determining the level of the audio data to be outputted may be performed after the operation of determining at least one speaker to output the audio data. However, this should not be considered as limiting. For example, the operation of the processor 870 determining the level of the audio data to be outputted may be performed before the operation of determining at least one speaker to output the audio data.

In operation 1107, the processor 870 in an embodiment may output the audio data through the at least one determined speaker. For example, the processor 870 may output the audio data through the speaker corresponding to the surface that is not facing the ground from among the first surface of the first housing 510-1 and the second surface of the second housing 510-3.

In an embodiment, while outputting the audio data through the at least one determined speaker, the processor 870 may iteratively perform operations 1103 to 1107 although this operation is not illustrated in FIG. 11. For example, when the state of the electronic device 101 is changed, the processor 870 may determine at least one speaker to output the audio data, based on the changed state of the electronic device 101, and may output the audio data through the at least one determined speaker.

Figure 12:
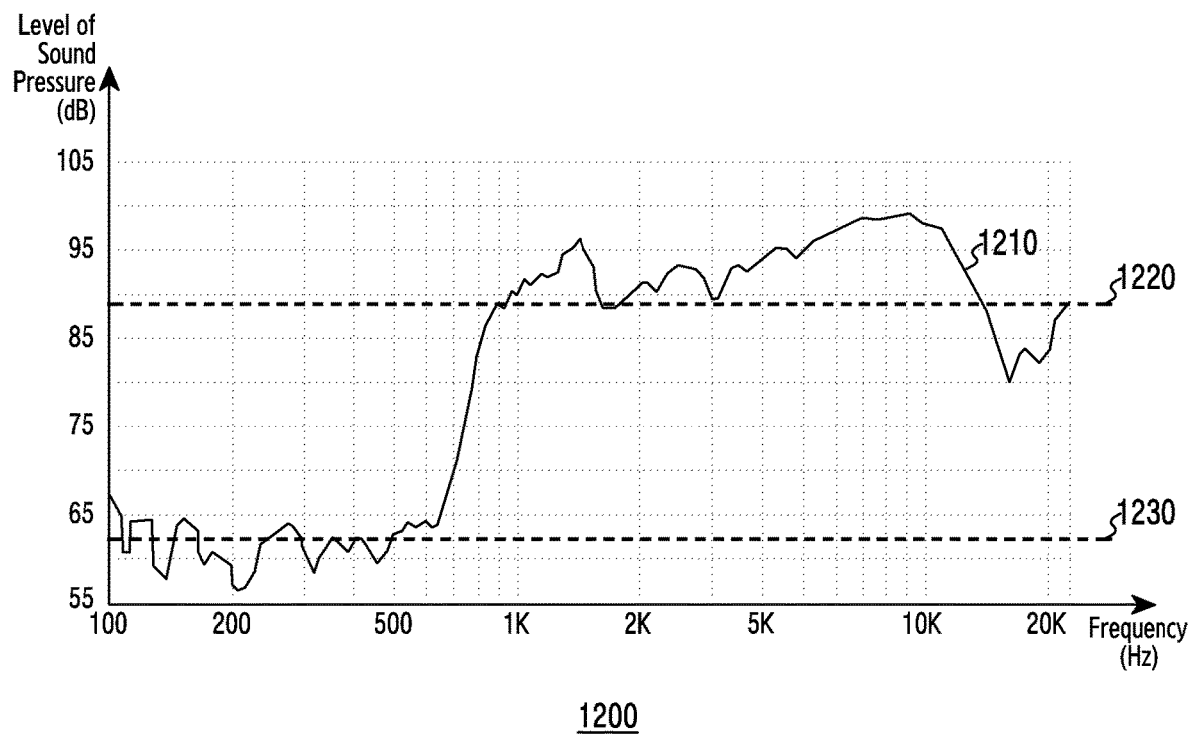
FIG. 12 is a graph illustrating audio data which is outputted through a first speaker according to an embodiment.
Figure 13:
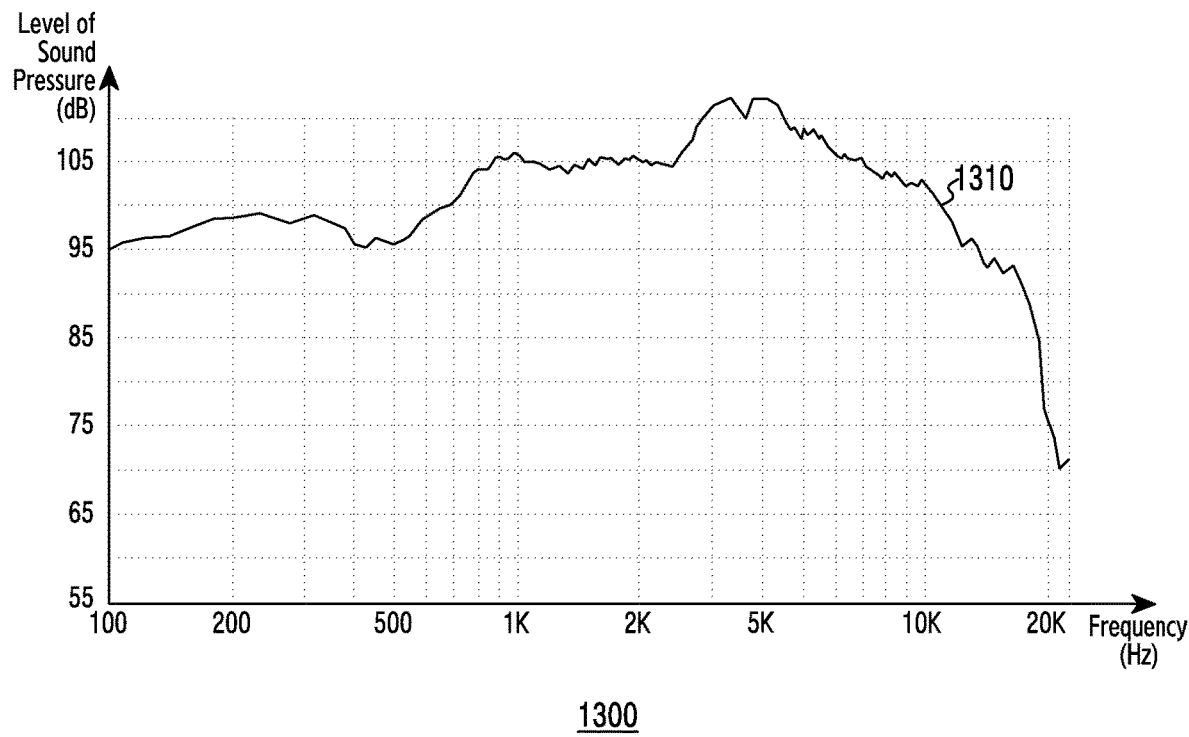
FIG. 13 is a graph illustrating audio data which is outputted through a second speaker according to an embodiment.

FIGS. 12 and 13 are graph 900 illustrating audio data which is outputted through the first speaker 530, and graph 1000 illustrating audio data which is outputted through the second speaker 540 according to an embodiment.

Referring to FIGS. 12 and 13, in an embodiment, FIG. 12 illustrates graph 1200 showing audio data which is outputted through the first speaker 530, and FIG. 13 illustrates graph 1300 showing audio data which is outputted through the second speaker 540.

In an embodiment, in FIG. 12, line 1210 may indicate a sound pressure level of audio data which is outputted in the first direction, in which the first surface of the first housing 510-1 is facing, through the first speaker 530 according to frequency. In an embodiment, line 1220 may indicate the average value of sound pressure levels of audio data which is outputted in the first direction, in which the first surface of the first housing 510-1 is facing, through the first speaker 530 according to frequency. In an embodiment, line 1230 may indicate the average value of sound pressure levels of audio data which is outputted in the opposite direction of the first direction, through the first speaker 530 according to frequency.

In an embodiment, as shown in FIG. 12, the average value 1230 of sound pressure levels of the audio data outputted in the opposite direction of the first direction through the first speaker 530 may be about $\frac{1}{10}$ of the average value of sound pressure levels of the audio data which is outputted in the first direction in which the first surface of the first housing 510-1 is facing. Accordingly, when the audio data is provided only through the first speaker 530, a sufficient volume may not be provided in the opposite direction of the first direction (for example, in the second direction in which the second surface of the second housing 510-3 is facing when the electronic device 101 is fully folded).

In an embodiment, in FIG. 13, line 1310 may indicate the sound pressure level of audio data which is outputted in the second direction in which the second surface of the second housing 510-3 is facing, through the second speaker 540 according to frequency. In an embodiment, as shown in FIG. 13, the sound pressure level of the audio data outputted through the second speaker 540 may be substantially similar to the sound pressure level of audio data which is outputted through the first speaker 530 of FIG. 12. In an embodiment, comparing FIGS. 12 and 13, the sound pressure level of the audio data which is outputted through the second speaker 540 in a low frequency domain (for example, a domain less than 1 KHz) may be higher than the sound pressure level of the audio data which is outputted through the first speaker 530. Based on this, when the audio data is outputted through the first speaker 530 and the second speaker 540, higher (or more sufficient) sound pressure level may be provided in the low frequency domain than when the audio data is outputted only through the first speaker 530.

A method for providing audio data in an electronic device 101 according to an embodiment of the disclosure may include: receiving an event related to audio data; identifying a state of the electronic device 101, based on information acquired through at least one sensor of the electronic device 101; determining at least one speaker to output the audio data from among a first speaker 530 which is disposed within a first housing 510-1 having a first surface facing in a first direction, and a second speaker 540 which is disposed within a second housing 510-3 having a second surface facing in a second direction, based on the state of the electronic device 101; and outputting the audio data through the at least one speaker.

In an embodiment, identifying the state of the electronic device 101 based on the information acquired through the at least one sensor of the electronic device 101 may include identifying, between the first surface and the second surface, a surface that a user contacts or is in proximity of, based on information acquired through the at least one sensor 850.

In an embodiment, determining the at least one speaker to output the audio data may include determining a speaker corresponding to the identified surface as the at least one speaker to output the audio data, from among the first speaker 530 and the second speaker 540.

In an embodiment, identifying the state of the electronic device 101 based on the information acquired through the at least one sensor 850 of the electronic device 101 may include identifying whether the electronic device 101 is placed face down to a ground, based on information acquired through the at least one sensor 850, and determining the at least one speaker to output the audio data may include, when it is identified that the electronic device 101 is placed facedown to the ground, determining, from among the first speaker 530 and the second speaker 540, a speaker disposed on a surface that does not face the ground from among the first surface and the second surface, as the at least one speaker to output the audio data.

In an embodiment, receiving the event related to the audio data may include: receiving an event related to call reception; and outputting the audio data through the first speaker 530, and determining the at least one speaker to output the audio data may include, while outputting the audio data through the first speaker 530, determining whether to output the audio data through the second speaker 540 in addition to the first speaker 530, based on a state of the electronic device 101.

In an embodiment, outputting the audio data through the at least one speaker may include, when it is determined that the audio data is to be outputted through the second speaker 540, in addition to the first speaker 530, outputting, by the first speaker 530 and the second speaker 540, the audio data at the same frequency.

In an embodiment, determining the at least one speaker to output the audio data may include determining a level of the audio data outputted through the determined at least one speaker, based on the state of the electronic device 101.

In an embodiment, the method may further include identifying whether the state of the electronic device 101 is changed while outputting the audio data through the determined at least one speaker, and determining at least one speaker to output the audio data from among the first speaker 530 and the second speaker 540, based on the changed state of the electronic device 101.

In an embodiment, the first speaker 530 may include a piezo-electric speaker having directionality in the first direction, and the second speaker 540 may include a vibration module having directionality in the second direction.

Figure 14:
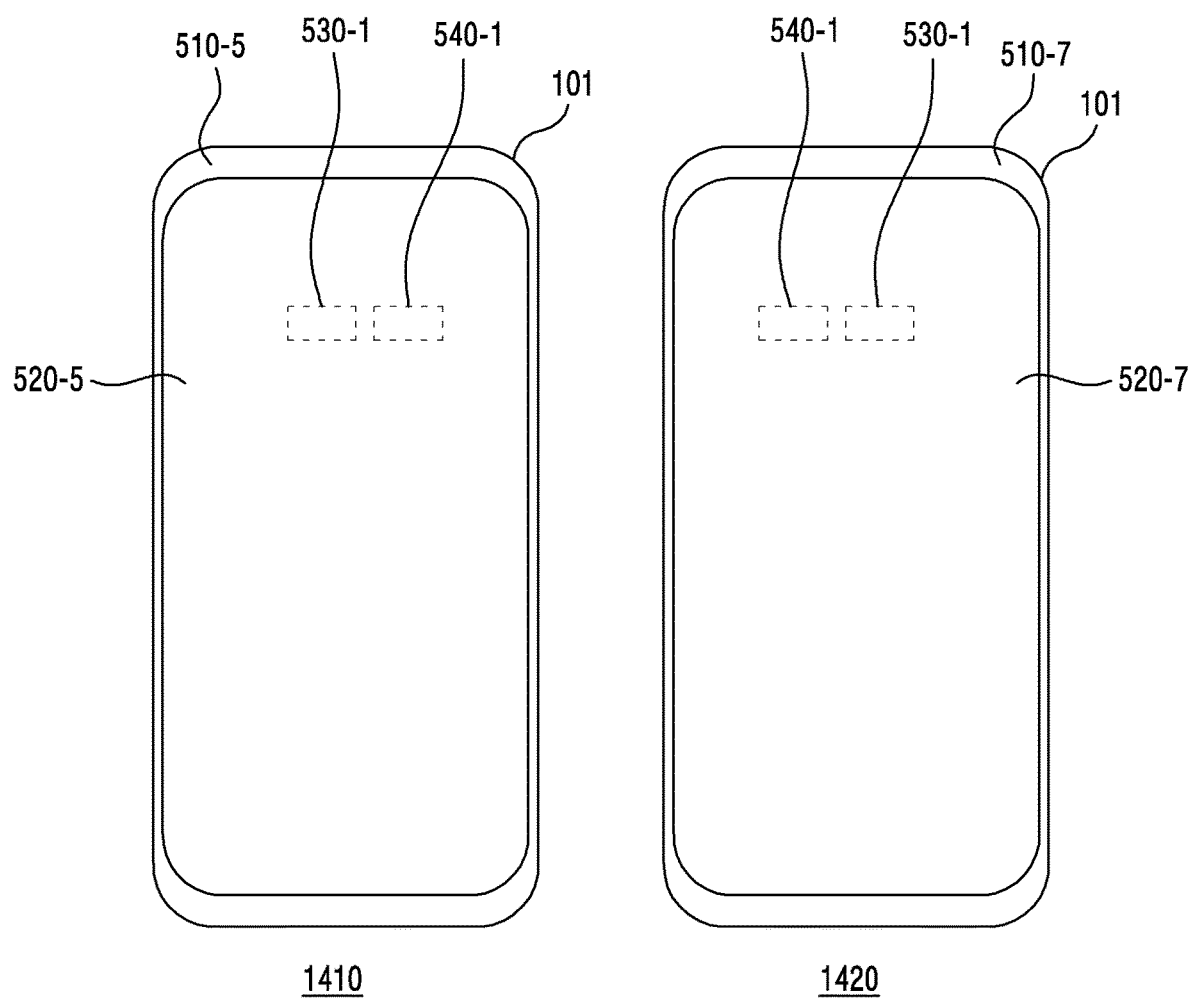
FIG. 14 is a view illustrating a front view and a rear view of an electronic device according to an embodiment.

FIG. 14 is a view illustrating a front view and a rear view of an electronic device 101 according to an embodiment.

Referring to FIG. 14, the electronic device 101 in an embodiment may be implemented by the electronic device 101 including the double side display.

In an embodiment, drawing 1410 may indicate a front view of the electronic device 101, and drawing 1420 may indicate a rear view of the electronic device 101.

In an embodiment, a first display 520-5 may be disposed on a front surface 510-5 of a housing. In an embodiment, a second display 520-7 may be disposed on a rear surface 510-7 of the housing.

In an embodiment, the electronic device 101 may include a first speaker 530-1 and a second speaker 540-1. In an embodiment, the first speaker 530-1 and the second speaker 540-1 may be the same as or similar to the first speaker 530 and the second speaker 540 of FIGS. 2 to 10, respectively, at least in part, and thus a redundant explanation is omitted.

In an embodiment, the first speaker 530-1 may output audio data (or sound) having directionality in the first direction in which the front surface 510-5 of the housing is facing. In an embodiment, the second speaker 540-1 may output audio data (or sound) having directionality in the second direction in which the rear surface 510-7 of the housing is facing.

In an embodiment, the electronic device 101 may provide audio data in the same or similar way as or to the method of providing the audio data, described in FIGS. 5 to 13. For example, the electronic device 101 may receive an event related to audio data. The electronic device 101 may identify a state of the electronic device 101. The electronic device 101 may determine at least one speaker to output the audio data from among the first speaker 530-1 and the second speaker 540-1, based on the identified state of the electronic device 101. The electronic device 101 may output the audio data through the at least one determined speaker. To avoid a redundant explanation, detailed description about the electronic device 101 in FIG. 14 for providing the audio data is omitted.

The electronic device 101 according to certain embodiments of the instant disclosure may include a housing including a first surface facing in a first direction and a second surface facing in a second direction, which is the opposite direction of the first direction, a first display 520-5 exposed to the outside through the first surface, a second display 520-7 exposed to the outside through the second surface, a first speaker 530-1 and a second speaker 540-1 which are disposed within the housing, at least one sensor, and at least one processor, and the at least one processor may be configured to receive an event related to audio data, to identify a state of the electronic device based on information acquired through the at least one sensor, to determine at least one speaker to output the audio data from among the first speaker 530-1 and the second speaker 540-1, based on the state of the electronic device 101, and to output the audio data through the at least one speaker.

In addition, a structure of data used in the embodiments of the disclosure described above may be recorded on a computer-readable recording medium through various means. The computer-readable recording medium includes a storage medium such as a magnetic storage medium (for example, a ROM, a floppy disk, a hard disk, etc.), an optical reading medium (for example, a CD-ROM, a DVD, etc.).

In an embodiment, in the electronic device 101, the computer-readable recording medium may record a program for executing: receiving an event related to audio data; identifying a state of the electronic device 101, based on information acquired through at least one sensor of the electronic device 101; determining at least one speaker to output the audio data from among the first speaker 530 which is disposed within the first housing 510-1 having the first surface facing in the first direction, and the second speaker 540 which is disposed within the second housing 510-3 having the second surface facing in the second direction, based on the state of the electronic device 101; and outputting the audio data through the at least one speaker.

The disclosure has been described with reference to its preferred embodiments. It will be understood by those skilled in the art that various changes in form and details may be made therein without departing from the spirit and scope of the disclosure. Therefore, the disclosed embodiments should be considered from the explanatory perspective, not from the limited perspective. The scope of the disclosure is described in the claims, not in the above-described explanation, and all differences within the range equivalent thereto should be interpreted as being included in the disclosure.

The invention claimed is:

1. An electronic device comprising:
    a housing including a first housing having a first surface facing in a first direction, and a second housing having a second surface facing in a second direction;
    a hinge unit rotatably connected to the first housing and the second housing;

a display exposed to an outside through the first surface of the first housing and the second surface of the second housing;
a first speaker disposed within the first housing;
a second speaker disposed within the second housing;
at least one sensor;
a processor operatively connected with the first speaker, the second speaker, and the at least one sensor; and
a memory operatively connected with the processor,
wherein the memory is configured to store instructions that, when being executed, cause the processor to:
receive a user input for receiving audio data from another electronic device after receiving an event related to a call reception from the other electronic device,
output the audio data through the first speaker which is set by default,
identify whether a state of the electronic device corresponds to a flat state, a folded state or an intermediate state, based on information acquired through the at least one sensor,
determine whether to output the audio data through the second speaker in addition to the first speaker which is outputting the audio data, based on the identified state of the electronic device, and
output the audio data through at least one speaker of the first speaker and the second speaker based on the determination.

2. The electronic device of claim 1, wherein the instructions further cause the processor to identify, between the first surface and the second surface, a surface that a user contacts or is in proximity of, based on information acquired through the at least one sensor.

3. The electronic device of claim 2, wherein the instructions further cause the processor to determine to output the audio data through a speaker corresponding to the identified surface from among the first speaker and the second speaker.

4. The electronic device of claim 1, wherein the instructions further cause the processor to identify whether the electronic device is placed face down to a ground, based on information acquired through the at least one sensor, and, when it is identified that the electronic device is placed face down to the ground, to determine to output the audio data through a speaker corresponding to a surface that does not face the ground from among the first surface and the second surface, from among the first speaker and the second speaker.

5. The electronic device of claim 1, wherein, when it is determined that the audio data is to be outputted through the second speaker, in addition to the first speaker, the instructions further cause the first speaker and the second speaker to output the audio data at a same frequency.

6. The electronic device of claim 1, wherein the instructions further cause the processor to determine a level of the audio data outputted through the at least one speaker, based on the state of the electronic device.

7. The electronic device of claim 1, wherein the instructions further cause the processor to identify whether the state of the electronic device is changed while outputting the audio data, and to determine the at least one speaker to output the audio data from among the first speaker and the second speaker, based on the changed state of the electronic device.

8. The electronic device of claim 1, wherein the first speaker comprises a piezo-electric speaker having directionality in the first direction.

9. The electronic device of claim 1, wherein the second speaker comprises a vibration module having directionality in the second direction.

10. A method for providing audio data in an electronic device, the method comprising:
receiving a user input for receiving audio data from another electronic device after receiving an event related to a call reception from the other electronic device;
outputting the audio data through a first speaker which is set by default;
identifying whether a state of the electronic device corresponds to a flat state, a folded state or an intermediate state, based on information acquired through at least one sensor of the electronic device;
determining whether to output the audio data through a second speaker, based on the identified state of the electronic device; and
outputting the audio data through at least one speaker of the first speaker and the second speaker based on the determination,
wherein the first speaker is disposed within a first housing having a first surface facing in a first direction, and
wherein the second speaker is disposed within a second housing a second surface facing in a second direction.

11. The method of claim 10, wherein identifying the state of the electronic device based on the information acquired through the at least one sensor of the electronic device further comprises identifying, between the first surface and the second surface, a surface that a user contacts or is in proximity of, based on information acquired through the at least one sensor.

12. The method of claim 11, wherein determining the at least one speaker to output the audio data further comprises determining to output the audio data through a speaker corresponding to the identified surface from among the first speaker and the second speaker.

13. The method of claim 10, wherein identifying the state of the electronic device based on the information acquired through the at least one sensor of the electronic device further comprises identifying whether the electronic device is placed face down to a ground, based on information acquired through the at least one sensor, and
wherein determining the at least one speaker to output the audio data further comprises, when it is identified that the electronic device is placed facedown to the ground, determining to output the audio data through a speaker corresponding to a surface that does not face the ground from among the first surface and the second surface, from among the first speaker and the second speaker.

14. The method of claim 10, wherein outputting the audio data through the at least one speaker further comprises, when it is determined that the audio data is to be outputted through the second speaker, in addition to the first speaker, outputting the audio data through the first speaker and the second speaker at a same frequency.

15. The method of claim 10, wherein outputting the audio data through the at least one speaker further comprises determining a level of the audio data outputted through the at least one speaker, based on the state of the electronic device.

16. The method of claim 10, further comprising:
identifying whether the state of the electronic device is changed while outputting the audio data; and determining the at least one speaker to output the audio data from among the first speaker and the second speaker, based on the changed state of the electronic device.

17. The method of claim 10, wherein the first speaker comprises a piezo-electric speaker having directionality in the first direction.

18. The method of claim 10, wherein the second speaker comprises a vibration module having directionality in the second direction.

* * * * *